(12) United States Patent
Wenzel et al.

(10) Patent No.: US 7,127,100 B2
(45) Date of Patent: *Oct. 24, 2006

(54) SYSTEM AND METHOD FOR ANALYZING AN IMAGE

(75) Inventors: Lothar Wenzel, Round Rock, TX (US); Dinesh Nair, Austin, TX (US); Ram Rajagopal, Austin, TX (US)

(73) Assignee: National Instruments Corporation, Austin, TX (US)

( * ) Notice: Subject to any disclaimer, the term of this patent is extended or adjusted under 35 U.S.C. 154(b) by 927 days.

This patent is subject to a terminal disclaimer.

(21) Appl. No.: 09/891,569

(22) Filed: Jun. 25, 2001

(65) Prior Publication Data

US 2003/0031357 A1 Feb. 13, 2003

(51) Int. Cl.
*G06K 9/00* (2006.01)

(52) U.S. Cl. .................................................... 382/154

(58) Field of Classification Search ............... 702/194, 702/188, 180, 167, 183; 345/441–443; 382/100, 108, 141–143, 151–154, 181, 190, 382/195, 199, 276, 280, 285

See application file for complete search history.

(56) References Cited

U.S. PATENT DOCUMENTS

| | | |
|---|---|---|
| 4,740,079 A | 4/1988 | Koizumi et al. |
| 5,378,915 A | 1/1995 | Hines et al. |
| 5,559,901 A | 9/1996 | Lobregt |
| 5,722,405 A | 3/1998 | Goldberg |
| 5,754,180 A | 5/1998 | Kivolowitz et al. |
| 5,790,442 A | 8/1998 | Ninomiya et al. |
| 5,797,396 A | 8/1998 | Geiser et al. |
| 5,815,596 A | 9/1998 | Ahuja et al. |
| 6,023,680 A | 2/2000 | Wooster et al. |
| 6,031,932 A | 2/2000 | Bronstein et al. |
| 6,100,893 A | 8/2000 | Ensz et al. |
| 6,175,644 B1 | 1/2001 | Scola et al. |
| 6,175,652 B1 | 1/2001 | Jacobson et al. |
| 6,229,921 B1 | 5/2001 | Wenzel et al. .............. 382/209 |
| 6,370,270 B1 | 4/2002 | Nair et al. |

(Continued)

OTHER PUBLICATIONS

Nair et al., "Image Processing and Low Discrepancy Sequences," SPIE Conference on Advanced Signal Processing Algorithms, Architectures, and Implementations IX, Jul. 1999, pp. 102-111.*

(Continued)

*Primary Examiner*—Vikkram Bali
(74) *Attorney, Agent, or Firm*—Meyertons Hood Kivlin Kowert & Goetzel, P.C.; Jeffrey C. Hood; Mark S. Williams

(57) ABSTRACT

A system and method for analyzing an image. The system may comprise a computer which includes a CPU and a memory medium which is operable to store one or more programs executable by the CPU to perform the method. The method may include: 1) receiving data describing an n-dimensional image, wherein the image is defined in a bounded n-dimensional space, wherein the image is embedded in an m-dimensional real space via an embedding function x( ), and wherein m>n; 2) determining a diffeomorphism (f,g) of the n-dimensional space; 3) computing the inverse transform ($f^{-1}$,$g^{-1}$) of the determined diffeomorphism (f,g); 4) selecting a plurality of points in the n-dimensional space; 5) mapping the plurality of points onto the image using $x(f^{-1},g^{-1})$ thereby generating a mapped plurality of points on the image; and 6) analyzing the mapped plurality of points to determine characteristics of the image.

36 Claims, 15 Drawing Sheets

U.S. PATENT DOCUMENTS

| | | |
|---|---|---|
| 6,510,244 B1 | 1/2003 | Proesmans et al. |
| 6,514,082 B1 | 2/2003 | Kaufman et al. |
| 6,529,193 B1 | 3/2003 | Herken et al. |
| 6,563,906 B1 | 5/2003 | Hussein et al. |
| 6,615,158 B1 * | 9/2003 | Wenzel et al. .............. 702/183 |
| 6,639,685 B1 | 10/2003 | Gu et al. |
| 6,643,533 B1 | 11/2003 | Knoplioch et al. |
| 6,690,474 B1 | 2/2004 | Shirley |
| 6,697,497 B1 | 2/2004 | Jensen et al. |
| 6,724,930 B1 | 4/2004 | Kosaka et al. |
| 2002/0141645 A1 | 10/2002 | Rajagopal et al. .......... 382/195 |

OTHER PUBLICATIONS

"Numerical Recipes in Fortran 77: The Art of Scientific Computing" (ISBN 0-521-43064-X) pp. 299-306, Copyright 1986-1992.

Davies, T.J.G. and R.R. Martin, "Low-discrepancy sequences for volume properties in solid modeling," CSG'98, 1998.

* cited by examiner

The first 1000 Halton points (left) and randomly chosen points (right)

Original LDS (left) and induced LDS (right)

Fourier transforms of original LDS (left) and induced LDS (right)

Well-distributed point set on the surface of a torus (left) and projections (right)

Well-distributed point set in a unit ball (left) and projections (right)

Edge Detection in an Image

Simplified model of alignment problem in fiber optics

SYSTEM AND METHOD FOR ANALYZING AN IMAGE

INCORPORATE BY REFERENCE

U.S. patent application Ser. No. 09/876,982 titled "System and Method for Generating a Low Discrepancy Curve on an Abstract Surface" which was filed on Jun. 8, 2001, and whose inventors are Lothar Wenzel, Ram Rajagopal, and Dinesh Nair, is hereby incorporated by reference in its entirety as though fully and completely set forth herein.

FIELD OF THE INVENTION

The present invention relates to the field of data analysis, and more particularly to generation of Low Discrepancy Sequences on an image.

DESCRIPTION OF THE RELATED ART

Many scientific and engineering tasks involve exploring, i.e., sampling or scanning, a region, such as an image, surface, or object, to acquire data characterizing the region. Examples of such tasks include parts inspection for automated manufacturing systems, alignment tasks for automated assembly systems, and detection, recognition, and location tasks in machine vision and motion control systems, among others. Another application relates to the determination of integrals of smooth functions defined on Riemannian geometries embedded in $R^n$, i.e., in multi-dimensional real-space, via sums of function values at well-chosen sampling points. Yet another domain application relates to the exploration and characterization of unknown spaces.

In a typical sampling or scanning system a computer system is coupled to a sensor, such as a camera, which is operable to acquire optical, image, or other information from a target object or surface. The computer system may take any of various forms. The system may also include hardware and corresponding software which is operable to move one or both of the sensor and the target object to perform the scan or measurement. In robotics and motion planning an understanding of the underlying geometry of space is important. Various techniques have been developed to scan regions under various constraints or toward specific goals. In many cases the geometry is known in advance and a specific goal is desired, such as object recognition and/or characterization. In others the space in question may not be characterized, i.e., the nature of the space may be unknown. Exploration of such a space may involve goals such as determining the dimensionality and structure of a space with unknown underlying geometry, or finding critical points of a high-dimensional space.

Typical applications of scanning spaces of known geometry include, but are not limited to: mine-countermeasure missions, continental shelf oceanographic mapping, contamination cleanup, floor scrubbing, crop plowing, non-destructive testing, and bridge inspections, among others. Many of these applications attempt efficient coverage of the space, and so involve determining a coverage plan for the scan region. Most coverage planners are still based on heuristics and the smoothness of the developed trajectories is rarely an issue.

There are many coverage algorithms. In many cases the goal is to guide a robot or sensor to explore or to act within an environment. See, for example, J. Colgrave, A. Branch, "A Case Study of Autonomous Household Vacuum Cleaner", AIAA/NASA CIRFFSS, 1994. See also M. Ollis, A. Stentz, "First Results in Vision-Based Crop Line Tracking", IEEE International Conference on Robotics and Automation, 1996.

One promising method in motion planning is based on Morse functions. These procedures look at the critical points of a Morse function to denote the topological changes in a given space. See, for example, Howie Choset, Ercan Acar, Alfred A. Rizzi, Jonathan Luntz, "Exact Cellular Decompositions in Terms of Critical Points of Morse Functions". See also Ercan U. Acar, Howie Choset, "Critical Point Sensing in Unknown Environments". However, Morse functions find their primary use with regard to the scanning of un-smooth surfaces, and so are not generally useful for many applications.

Exploration tasks often relate to characterization of unknown spaces. One approach to efficient exploration of a surface or space is based upon Low Discrepancy Sequences (LDS), described below in some detail. However, current techniques generally involve generation of LDSs in simple Euclidean spaces, which may not be appropriate for more complex applications.

Therefore, improved systems and methods are desired for generating a sampling point set, such as a Low Discrepancy Sequence, in a region or on a manifold or surface of an object.

SUMMARY OF THE INVENTION

The present invention comprises various embodiments of a system, method, and memory medium for analyzing a surface, wherein the surface may be a surface of an object, a region, and/or an n-dimensional volume. The surface may also be a Riemannian manifold or an n-dimensional space describing degrees of freedom of an object or device, such as a motion device, e.g., a robotic arm. The method may involve generating a point set or sequence on the surface, acquiring data or taking measurements of the surface at these sample points, and analyzing the measured data to characterize the surface.

The method may include generating a sequence, such as a Low Discrepancy Sequence, within a region or space in which the surface is defined. The sequence may be used for characterizing the surface, such as a high-dimensional space, or for motion planning. Embodiments of the invention include a method for generating a Low Discrepancy Sequence in a Riemannian manifold, e.g., on an n-dimensional surface.

Specifically, an embodiment of the method is described in which a Low Discrepancy Sequence is generated on an n-dimensional space, for example, a unit square, then mapped to the manifold or surface. It is also contemplated that other sequences of points may be mapped in a similar manner, and that regions other than the unit n-square may be used. In one embodiment, the manifold may be a Riemannian manifold. In other words, the manifold may be characterized by a distance-like metric.

In one embodiment, data may be received describing a surface which is defined in a bounded n-dimensional space, also referred to as a bounded n-space. In one embodiment, the bounded n-dimensional space may comprise a unit square. In another embodiment, the bounded n-dimensional space may comprise a unit cube. As mentioned above, in various other embodiments, the bounded n-dimensional space may comprise other geometries, including unit hyper-cubes, or unit n-cubes of dimensionalities greater than 3, as well as n-dimensional rectangles, spheres, or any other geometrical region. In one embodiment, the surface may further be embedded in an m-dimensional space, where m>n. In other words, the surface may be parameterized in terms of a higher dimensional space according to an embedding function x( ).

The received data may include a Riemannian metric characterizing the surface or manifold. In one embodiment, the surface may comprise an image, and the received data may further comprise an intensity function describing the image, e.g., describing pixel information of the image.

A diffeomorphism f of the bounded n-space may be determined. As is well known in the art, a diffeomorphism may be considered a mapping between two spaces which preserves differentiability of a mapped function.

An inverse transform $f^{-1}$ of the determined diffeomorphism may be computed. Then, a plurality of points in the bounded n-space may be selected or determined. In one embodiment, the plurality of points may comprise a Low Discrepancy Sequence. It should be noted that although selection of a Low Discrepancy Sequence of points is an exemplary use of the method, any other point set may be used as desired.

In response to the selection of the plurality of points, the plurality of points may be mapped onto the surface via $x(f^{-1})$ to generate a mapped plurality of points, e.g., a mapped Low Discrepancy Sequence. Note that the function $x(f^{-1})$ may be a functional concatenation of the embedding function x( ) and the inverse transform of the diffeomorphism, $f^{-1}$.

The surface may be sampled or measured using at least a subset of the mapped plurality of points. In other words, measurements may be made at one or more of the mapped plurality of points, thereby generating one or more samples of the surface.

Finally, the generated samples of the surface may be analyzed to determine one or more characteristics of the surface. For example, in one embodiment, the surface may comprise a surface of an object, and the analyzing may comprise analyzing the samples of the surface to determine one or more characteristics of the object.

It should be noted that in some embodiments, the mapped plurality of points, e.g., the mapped Low Discrepancy Sequence, may simply be output for later use by the system or by other systems. In other words, the sampling and/or analyzing may be performed by other systems, or at a later time. In one embodiment, outputting the mapped points (Low Discrepancy Sequence) may comprise storing the Sequence for later use. In another embodiment, outputting the mapped Low Discrepancy Sequence may comprise displaying the sequence on a display device.

Thus, by using the above-described method, a plurality of points, e.g., a Low Discrepancy Sequence, generated on a unit square (or other suitable geometry) may be mapped to a surface, such as an abstract surface or manifold. It should be noted that any point set generated on the unit square (or other suitable geometry) may be mapped in this way. This mapped plurality of points may operate to ideally represent or characterize the surface, wherein measurements taken at these mapped points indicate characteristics of the surface.

In one embodiment, the above embodiment may be used to generate a scan path for a scanning application, such as a six degree of freedom alignment problem, for example. Other applications may include determination of scanning sequences for one or more robotic arms, where the scan space may describe degrees of freedom for the robotic arms, among others. For example, the scan space for the robotic arm may be a 6-dimensional space representing 3 positional degrees of freedom, and 3 directional or orientation degrees of freedom. Alternately, the degrees of freedom may relate to the degrees of freedom of joints or other articulated components of the arm. In one embodiment, the robotic arm may include a directional sensor, and the sampling may include measuring a vector field at one or more of the mapped plurality of points. One example of such an application relates to the location of an acoustic source via discrete sampling of sound strength and direction, such as by a directional microphone.

One of the most straightforward applications for Low Discrepancy Sequences are calculations of integrals of smooth functions defined on Riemannian geometries embedded in $R^m$. The replacement of integrals by sums of function values of well-chosen sampling points offers the same advantages as those based on low-discrepancy sets defined in unit cubes.

Another application field for Low Discrepancy Sequences is image processing, in which an intensity function of an image may be reinterpreted as a surface. In other words, the surface may comprise an image. Sampling of the image may comprise using or measuring pixel values at pixel locations corresponding to the mapped plurality of points. It should also be noted that in this embodiment, sampling may not necessarily involve measurement with a sensor, but rather may refer to calculation of an intensity value (or other pixel-related quantity) based on a function, e.g., an intensity function. The computed samples may then be analyzed to determine characteristics of the image. In one embodiment, the image may comprise information related to an object, where the analyzing may be performed to determine one or more characteristics of the object.

A Riemannian metric for the surface based on the intensity function may be determined, as well as a diffeomorphism representing information contained in the intensity function. In real applications, the integrals may be replaced with sums of function values. More importantly, the inverse diffeomorphism in conjunction with appropriate sampling strategies in the unit square may allow an induced sampling of a given image content. Thus, an image may be considered an abstract Riemannian surface or manifold.

It should be noted that although typical images are two-dimensional images, higher dimensional images are also contemplated. For example, complex multi-dimensional data sets may be considered images, and the methods described herein may be used to explore and characterize the data sets, or objects and features contained therein. Examples of 3-dimensional images include 3d medical images, and 3d seismic images, among others. It is also contemplated that data sets represented by even higher dimensional images (4d and above) may be characterized by various embodiments of the present invention. In other words, any data set may be represented by an image of suitable dimensionality.

The intensity values at selected points may describe the image content in an efficient manner and may be used to compress an image or to characterize its content. To a certain extent, the resulting description can be regarded as a generalized edge detector that is highly optimized for a specific image. Potential applications can be found in pattern matching where a given template should be characterized by a small amount of pixels, to speed up successive search operations. The use of low-discrepancy sets offers the advantages mentioned before.

In one embodiment, data may be received describing an image which is defined in a bounded n-dimensional space, or n-space, and which may be embedded in an m-dimensional space, or m-space via an embedding function x( ), where m>n. In one embodiment, the bounded n-space may comprise a unit square (i.e., n=2). In other embodiments the bounded n-space may comprise a unit cube (n=3), a unit hyper-cube (n=4), or a unit n-cube where n>4. It is noted that the bounded n-space may not be limited to unit n-cubes, but may also comprise any other suitable geometry, including a unit n-sphere, rectangles of various dimensionalities, or any other geometry, as desired. It is also noted that the n-space needn't be of unit size, but may be of any size appropriate for the application or image under consideration.

In one embodiment, the received data may include an intensity function, as mentioned above. For example, for a gray-scale image, the intensity function may describe the gray-scale pixel value at each point in the image. Similarly, for a color image, the intensity function may provide pixel data for each point in the image.

A diffeomorphism (f,g) of the n-space may then be determined. As is well known in the art, a diffeomorphism may be considered a mapping between two spaces which preserves differentiability of a mapped function.

An inverse transform $(f^{-1},g^{-1})$ of the determined diffeomorphism may be computed. Then, a plurality of points in the bounded n-space may be selected or determined. In one embodiment, the plurality of points may comprise a Low Discrepancy Sequence. It should be noted that although selection of a Low Discrepancy Sequence of points is an exemplary use of the method, any other point set may be used as desired.

After the selection of the plurality of points, the plurality of points may be mapped onto the surface via $x(f^{-1},g^{-1})$ to generate a mapped plurality of points, e.g., a mapped Low Discrepancy Sequence. Note that the function $x(f^{-1},g^{-1})$ may be a functional concatenation of the embedding function x( ) and the inverse transform of the diffeomorphism, $(f^{-1},g^{-1})$.

Finally, the mapped plurality of points may be analyzed to determine one or more characteristics of the image. In one embodiment, the mapped plurality of points may be analyzed to detect edges in the image. In other embodiments, analyzing the mapped plurality of points may include performing pattern recognition, where features or objects comprised or represented in the image may be detected and/or characterized.

Yet another application of the method relates to a fiber optic array alignment problem. Given an array of fibers where a second array of theses fibers must be aligned accurately. Typically, lasers are applied and the intensity of these beams may be measured to align the arrays.

Said another way, the surface may comprise a multi-dimensional space describing degrees of freedom for a motion stage, or for first and/or second motion stages, where the first and second motion stages couple respectively to first and second optical fibers (or groups of optical fibers). A laser beam may be directed through the first optical fiber. Samples may be taken at a plurality of points in the search space, where the sampling includes measuring the laser beam intensity through the second optical fiber at one or more of the mapped plurality of points. One or both of the first and second motion stages may be moved until the measured laser beam intensity indicates that the optical fibers are substantially aligned.

It should be noted that the above examples are meant to be illustrative, and are not intended to limit the domain of applicability of the method.

A system may implement any of the above methods for generating a Low Discrepancy Sequence in a Riemannian Manifold or surface and for scanning or analyzing the surface. The system may comprise a computer system coupled to a sensor. An embodiment of the system may also include a motion control element, or actuator. The computer system may comprise a CPU and a memory medium, or programmable logic, which is operable to store a scanning or analysis program that implements one of the above methods. An embodiment of each of the above invention(s) may also be a software program or programs stored on a memory medium.

BRIEF DESCRIPTION OF THE DRAWINGS

A better understanding of the present invention can be obtained when the following detailed description of the preferred embodiment is considered in conjunction with the following drawings, in which.

Figure 1A:
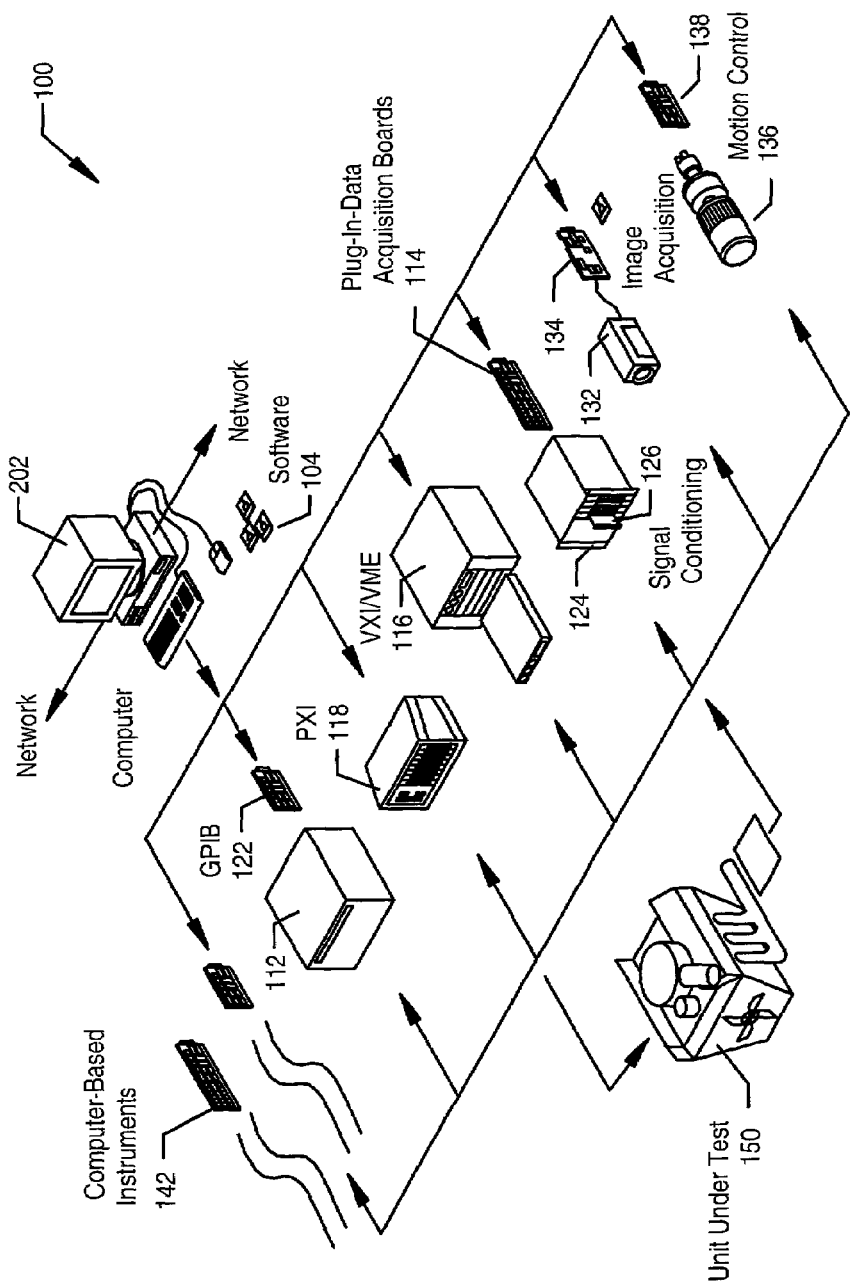
FIGS. 1A and 1B illustrate representative instrumentation and automation systems including various measurement options.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Figure 1B:
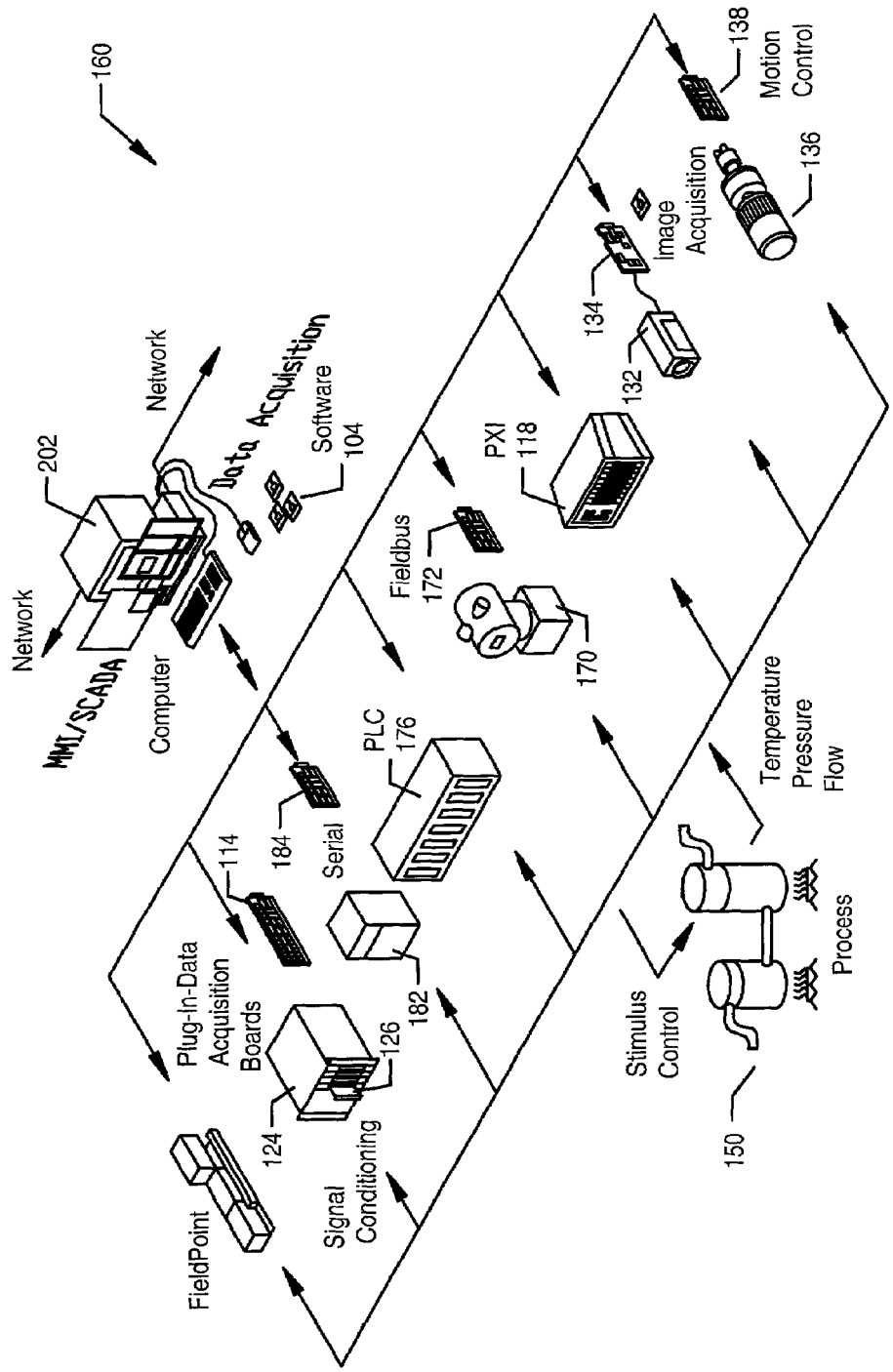

FIGS. 1A and 1B—Instrumentation and Industrial Automation Systems

FIGS. 1A and 1B illustrate exemplary systems which may store or use programs for analyzing a surface, such as a surface of an object, as described herein. As shown, possible applications of the present invention include image processing/machine vision, instrumentation, industrial automation, process control, or other purposes. These programs may of course be stored in or used by other types of systems as desired.

FIG. 1A illustrates an instrumentation control system 100. The system 100 comprises a host computer 102 which connects to one or more instruments. The host computer 102 may comprise a CPU, a display screen, memory, and one or more input devices such as a mouse or keyboard as shown. The computer 102 connects through the one or more instruments to analyze, measure, or control a unit under test (UUT) or process 150. The host computer 102 may store computer programs for analyzing a surface of an object as described herein The one or more instruments may include a GPIB instrument 112 and associated GPIB interface card 362, a data acquisition board 184 and associated signal conditioning circuitry 124, a VXI instrument 116, a PXI instrument 118, a video device 132 and associated image acquisition card 134, a motion control device 136 and associated motion control interface card 138, and/or one or more computer based instrument cards 142, among other types of devices.

The GPIB instrument 112 may be coupled to the computer 102 via the GPIB interface card 362 provided by the computer 102. In a similar manner, the video device 132 may be coupled to the computer 102 via the image acquisition card 134, and the motion control device 136 may be coupled to the computer 102 through the motion control interface card 138. The data acquisition board 184 may be coupled to the computer 102, and may interface through signal conditioning circuitry 124 to the UUT. The signal conditioning circuitry 124 may comprise an SCXI (Signal Conditioning extensions for Instrumentation) chassis comprising one or more SCXI modules 126.

The GPIB card 362, the image acquisition card 134, the motion control interface card 138, and the DAQ card 184 may be plugged in to an I/O slot in the computer 102, such as a PCI bus slot, a PC Card slot, or an ISA, EISA or MicroChannel bus slot provided by the computer 102. However, these cards 362, 134, 138 and 184 are shown external to computer 102 for illustrative purposes.

The VXI chassis or instrument 116 may be coupled to the computer 102 via a VXI bus, MXI bus, or other serial or parallel bus provided by the computer 102. The computer 102 may include VXI interface logic, such as a VXI, MXI or GPIB interface card (not shown), which interfaces to the VXI chassis 116. The PXI chassis or instrument may be coupled to the computer 102 through the computer's PCI bus.

A serial instrument (not shown) may also be coupled to the computer 102 through a serial port, such as an RS-232 port, USB (Universal Serial bus) or IEEE 1394 or 1394.2 bus, provided by the computer 102. In typical instrumentation control systems an instrument will not be present of each interface type, and in fact many systems may only have one or more instruments of a single interface type, such as only GPIB instruments.

The instruments may be coupled through one or more sensors or transducers to the unit under test (UUT) or process 150. The system 100 may be used in a data acquisition and control application, in a test and measurement application, a process control application, a man-machine interface application, a hardware-in-the-loop applications, or a simulation application, among others.

FIG. 1B illustrates an exemplary industrial automation system 160. The industrial automation system 160 is similar to the instrumentation or test and measurement system 100 shown in FIG. 1A. Elements which are similar or identical to elements in FIG. 1A have the same reference numerals for convenience. The system 160 comprises a computer 102 which couples to one or more devices or instruments. The computer 102 may comprise a CPU, a display screen, memory, and one or more input devices such as a mouse or keyboard as shown. The computer 102 may connect through the one or more devices to a process or device 150 to perform an automation function, such as MMI (Man Machine Interface), SCADA (Supervisory Control and Data Acquisition), portable or distributed data acquisition, process control, advanced analysis, or other control. In FIG. 1B, the computer 102 may store computer programs for analyzing a surface as described herein.

The one or more devices may include a data acquisition board 184 and associated signal conditioning circuitry 124, a PXI instrument 118, a video device 132 and associated image acquisition card 134, a motion control device 136 and associated motion control interface card 138, a fieldbus device 170 and associated fieldbus interface card 172, a PLC (Programmable Logic Controller) 176, a serial instrument 182 and associated serial interface card 184, or a distributed data acquisition system, such as the Fieldpoint system available from National Instruments, among other types of devices.

The DAQ card 184, the PXI chassis 118, the video device 132, and the image acquisition card 136 may be connected to the computer 102 as described above. The serial instrument 182 may be coupled to the computer 102 through a serial interface card 184, or through a serial port, such as an RS-232 port, provided by the computer 102. The PLC 176 may couple to the computer 102 through a serial port, Ethernet port, or a proprietary interface. The fieldbus interface card 172 may be comprised in the computer 102 and may interface through a fieldbus network to one or more fieldbus devices. Each of the DAQ card 184, the serial card 184, the fieldbus card 172, the image acquisition card 134, and the motion control card 138 are typically plugged in to an I/O slot in the computer 102 as described above. However, these cards 184, 184, 172, 134, and 138 are shown external to computer 102 for illustrative purposes. In typical industrial automation systems a device will not be present of each interface type, and in fact many systems may only have one or more devices of a single interface type, such as only PLCs. The devices are coupled to the device or process 150.

Figure 2:
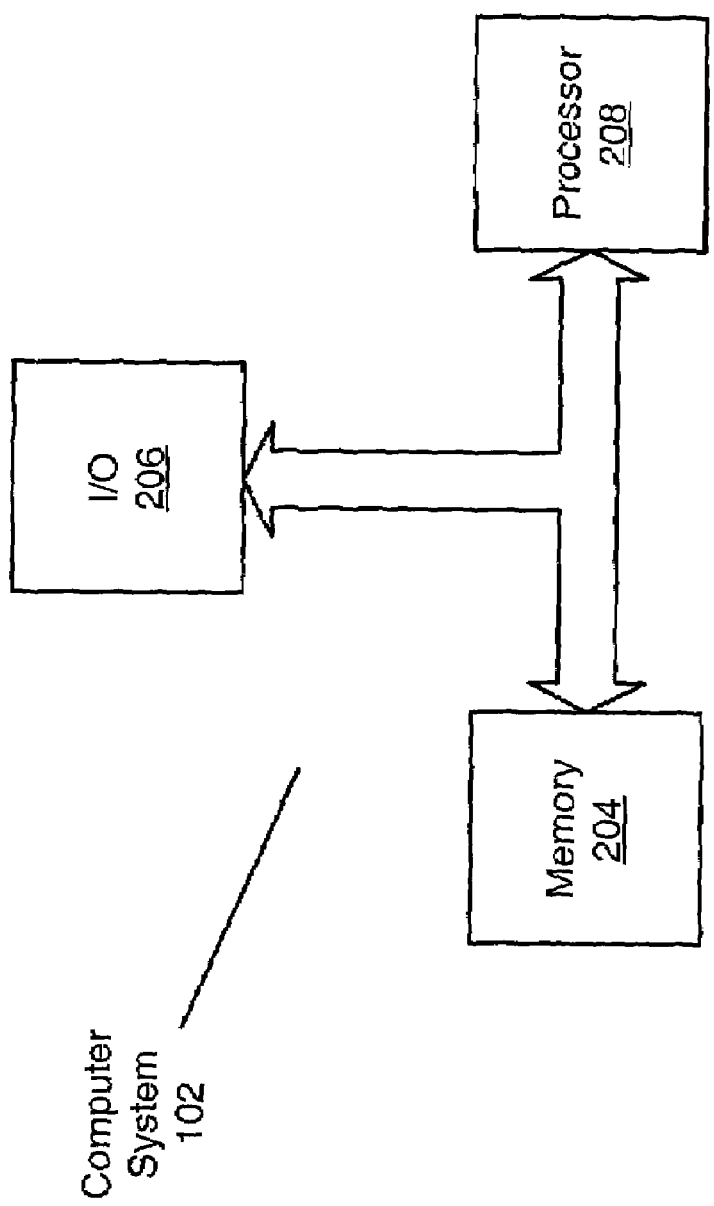
FIG. 2 is a block diagram of the computer system of FIGS. 1A and 1B, suitable for implementing various embodiments of the invention.

FIG. 2—Computer System Block Diagram

FIG. 2 is a block diagram of an exemplary computer system 102 which may be used to implement various embodiments of the present invention. As FIG. 2 shows, the computer system 102 may include a memory 204 which is operable to store one or more software programs for implementing the methods described below. The computer system 102 may also include a processor or CPU 208 which may be operable to execute the one or more software programs for implementing the methods. The computer system 102 may include programmable logic instead of, or in addition to, the CPU 208 and memory 204. The computer system 102 may store and/or execute one or more software programs which perform the methods described below with reference to FIGS. 5–10.

The computer system 102 may also optionally include a measurement or data acquisition device 206 for measuring or acquiring data of an object or unit under test. In other embodiments, e.g., where the methods described herein are used to analyze abstract data such as financial data, stock data, or futures data, the computer system 102 may not include a measurement device 206.

The computer may further include an Input/Output (I/O) interface (not shown) for communication with external systems, such as a display, keyboard, or mouse, a data acquisition device, or for communication with a network.

In one embodiment, the computer system 102 may include a display device, such as a monitor, as well as a chassis and one or more I/O devices, such as a keyboard and/or mouse. However, the computer system may take any of various forms.

Referring again to FIGS. 1A, 1B, and 2, the computer system 102 may include a memory medium on which one or more computer programs according to the present invention may be stored. The term "memory medium" is intended to include an installation medium, e.g., a CD-ROM, floppy disks 104, or tape device; a computer system memory or random access memory such as DRAM, SRAM, EDO RAM, Rambus RAM, etc.; or a non-volatile memory such as a magnetic media, e.g., a hard drive, or optical storage. The memory medium may comprise other types of memory as well, or combinations thereof.

In addition, the memory medium may be located in a first computer in which the programs are executed, or may be located in a second different computer which connects to the first computer over a network, such as the Internet. In the latter instance, the second computer provides the program instructions to the first computer for execution.

Also, the computer system 102 may take various forms. As used herein, the term "computer system" is intended to encompass any of various devices which include a processor that can execute instructions from a memory medium and/or may include a programmable logic device that can be configured to execute a method or algorithm. Exemplary computer systems 102 include a personal computer system, mainframe computer system, workstation, network appliance, Internet appliance, personal digital assistant (PDA), television system, embedded device, intelligent instrument, a smart sensor, and other systems. The computer system 102 may be configured to execute the methods described with reference to FIGS. 5–10.

In one embodiment, the software programs which implement the methods described herein are designed for data acquisition/generation, measurement, analysis and/or display, machine vision, simulation, or for controlling or modeling instrumentation or industrial automation hardware. Example applications where the method described herein may be used include inspection systems, industrial automation or motion control systems, measurement systems, image processing or machine vision systems, robotics, phased array systems and any other application where it is desirable to determine characteristics of an object or space by measuring (or sampling or scanning) a surface of the object or space. For more information on the generation of scan paths on abstract data sets see U.S. patent application Ser. No. 09/876,982 titled "System and Method for Generating a Low Discrepancy Curve on an Abstract Surface" which was filed on Jun. 8, 2001, which was incorporated by reference above. More specific applications wherein the method of the present invention may be used include robotics, and phased array control systems, as well as sampling or scanning related to image data, measurement data, acoustic data, seismic data, financial data, stock data, futures data, business data, scientific data, medical data, and biometric data, among others. However, it is noted that the present invention can be used for a plethora of applications and is not limited to the above applications. Thus, the method of the present invention may be implemented in any of various types of devices and any of various types of applications.

FIGS. 3A–E—Example Applications of the Scanning System

FIGS. 3A–E illustrate various exemplary applications where various embodiments of the present invention may be used. However, it is noted that the invention is not limited to these applications, but rather may be used in any of various applications.

Figure 3A:
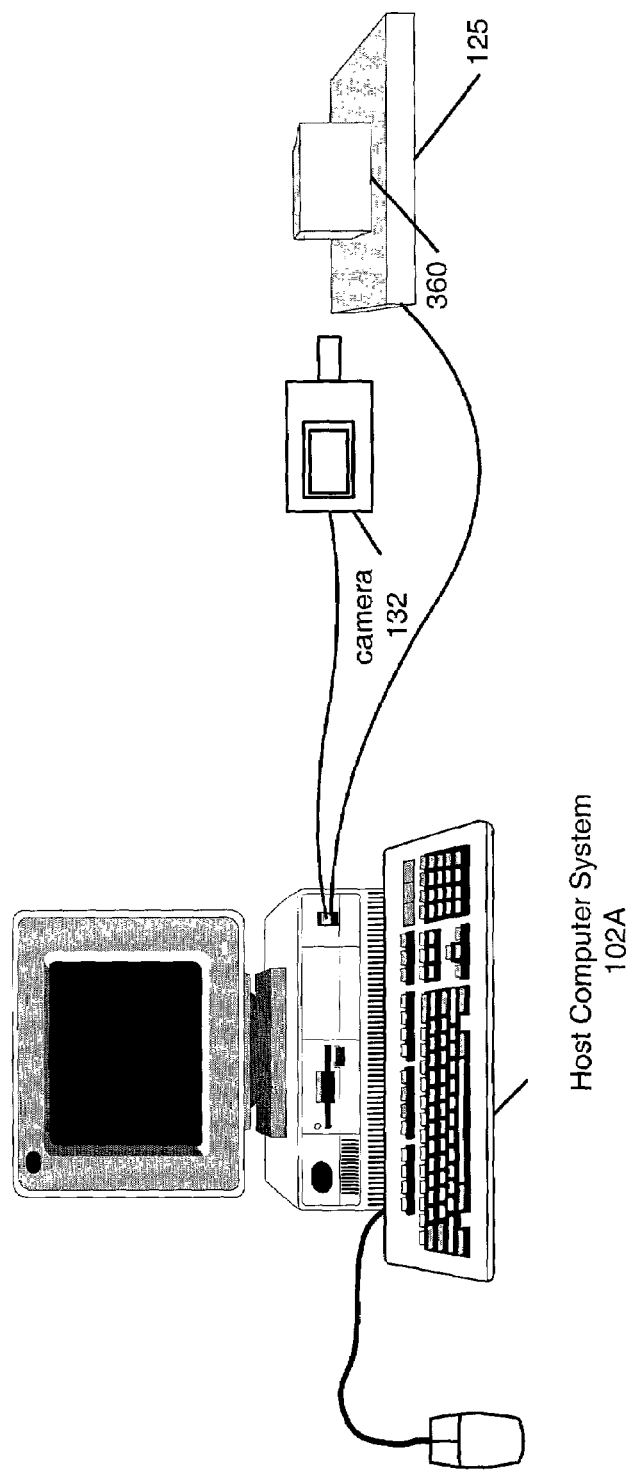
FIG. 3A illustrates a scanning system, according to one embodiment of the present invention.

FIG. 3A—Image Processing System

FIG. 3A illustrates an image processing system (or scanning system) according to one embodiment of the present invention. As FIG. 3A shows, computer system 102A may be coupled to a camera or sensor 132 which may be operable to acquire optical, image, or other information from an object 360. In one embodiment, the scanning system may also include a motion control component 125, such as a motion control stage, which may be operable couple to the computer system 102A. The motion control state may receive control signals from the computer system 102A and may move the object 360 with respect to the camera/sensor 132 for scanning purposes. In another embodiment, the motion control component may move the camera/sensor 132 instead of the object 360 to scan the object 360. It is noted that as used herein, the term "scanning" may refer to continuous scanning or to discrete scanning, also referred to as sampling.

The sensor (camera 132) may also be referred to as a remote scanning device. In one embodiment, the sensor 132 may be a camera or other image acquisition device, which may be adapted to receive one or more portions of the electromagnetic (EM) spectrum, e.g., visible light, infrared, or ultraviolet (UV) light. In another embodiment, the sensor may be an ultrasonic device for detecting sound waves. In various other embodiments, the sensor may be capable of detecting or measuring any of a variety of measurable phenomena. Thus the sensor may use any of various techniques to sample or scan an object, image, or surface, and produce image data, including visible light, infrared, ultrasonic, light interferometer, and other non-contact and contact methods, or other measurement data.

In one embodiment, the computer system 102A may operate to "scan" previously acquired data, e.g., scan stored data in a data mining application. In this instance, the system may not require sensor 132 for scanning a physical object or region, as the data being analyzed has been previously acquired and stored.

The computer system 102A may include a display device, such as a monitor, as well as a chassis and one or more I/O devices, such as a keyboard and/or mouse. However, the computer system 102A may take any of various forms.

In this example, one sensor 132 (a camera in this example) scanning one object 360 is shown, but in other embodiments any number of sensors or cameras 132 may be used to scan any number of objects 360. The camera 132 may comprise any type of camera or device operable to acquire images of the object 360. The objects 360 may be stationary, or may be conveyed into and out of the field of view of the one or more cameras 132.

The camera 132 may be operable to output a video stream to computer system 102, e.g., to an image acquisition (IMAQ) device comprised in the computer system 102. The computer system 102 may then analyze the images captured by the image acquisition board. Alternatively, the image acquisition board may include an on-board processor and memory for performing a portion or all of the image analysis. As another example, the camera 132 may be a smart camera that includes the image processing function as well as the image acquisition function. Thus, the smart camera may include a processor and memory, or programmable logic, for performing the method described herein. More generally, a system according to an embodiment of the invention may be implemented in a smart sensor.

The computer system 102A (or smart camera or other smart sensor) may use or store software which analyzes the image data received from the camera 132, and controls the sampling or scanning operation, i.e., determines the scan path or sample points over the object. The system may also comprise one or more motion systems for moving the camera, the object, or both, in order to implement the scanning scheme. The motion system may be a motion control system, such as is available from National Instruments Corporation.

Figure 3B:
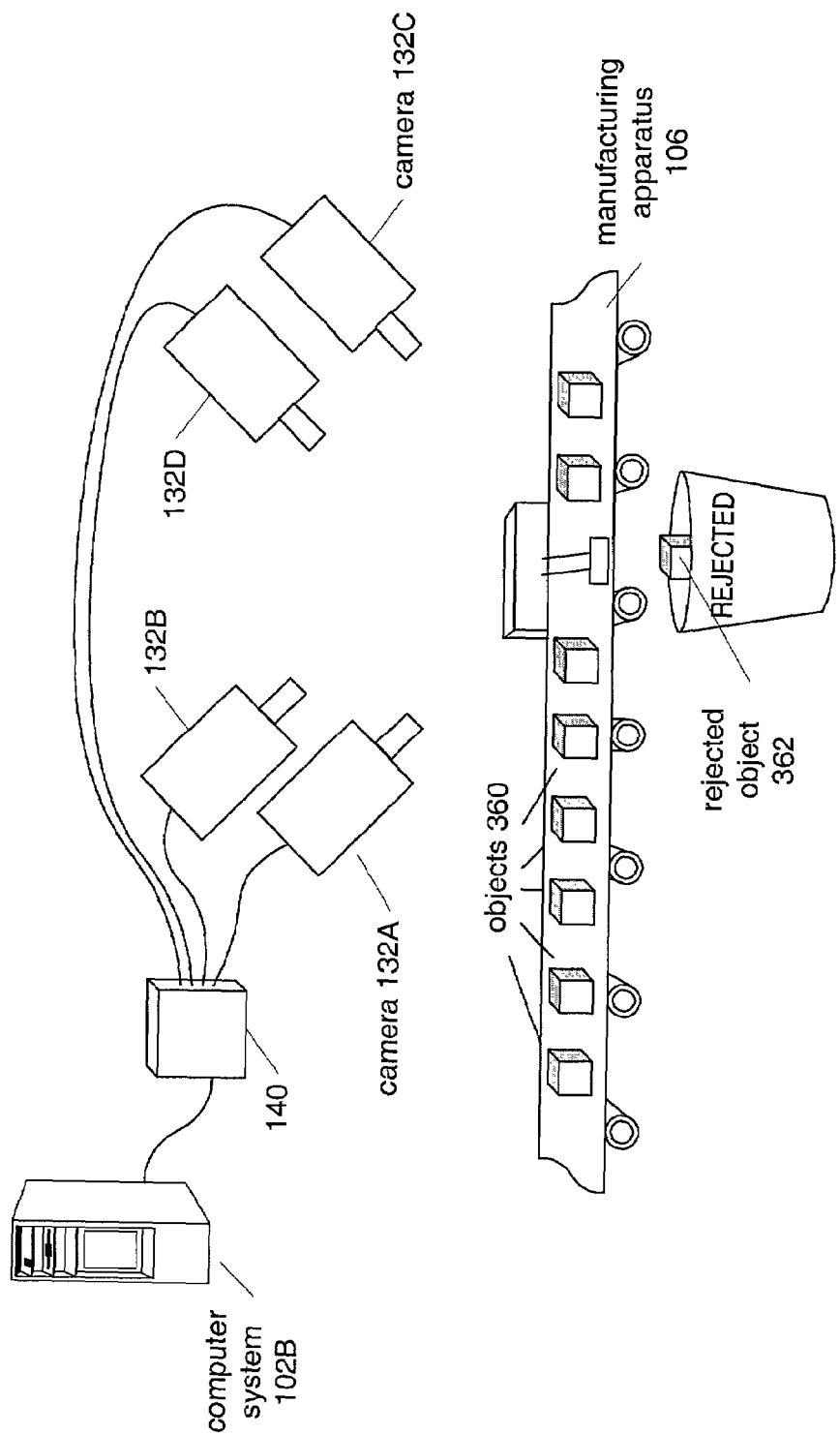
FIG. 3B illustrates a machine vision application of a scanning system, according to one embodiment.

FIG. 3B—Machine Vision Application of the Present Invention

In a machine vision or automated inspection application of the present invention, shown in FIG. 3B, a system similar to that shown in FIG. 3A may implement the present scanning methodology in software and/or hardware for quality control in a manufacturing process. As FIG. 3B shows, one or more cameras 132A–D may be coupled to computer system 102B for scanning objects from several points of view. In this example, objects 360 are carried past the one or more cameras 132 by manufacturing apparatus 106. The system may operate to scan each object 360, and the images received from each camera 132 may be analyzed using image processing software executing on the computer system 102B. The analyses of the images may be used to detect defects or other characteristics of the object 360. For example, in various applications the analyses may be designed to detect one or more of: physical surface defects (scratches, etc.); one or more components located correctly on the object; a correct label on the object; a correct marking on the object; correct color information on the object, etc. Thus, in a machine vision manufacturing application, the results of the image analyses may be used to determine whether an object meets desired production standards. This determination may be performed in any of various ways, as desired for a particular application. If the object does not meet the desired production standards, the object may be rejected, as shown in the case of object 362.

Figure 3C:
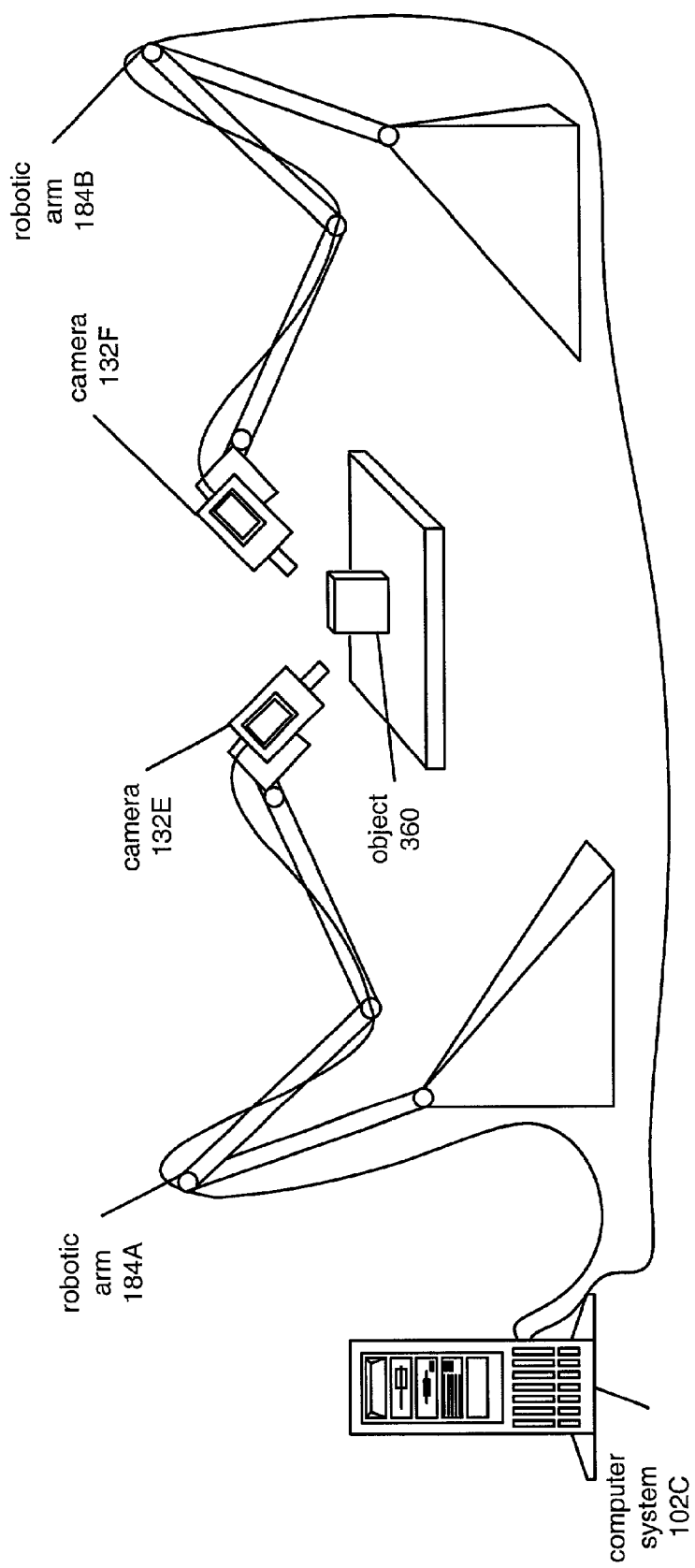
FIG. 3C illustrates a robotics application of a scanning system, according to one embodiment of the present invention.

FIG. 3C—Robotics Application of the Present Invention

FIG. 3C illustrates an example application of the present invention in the field of robotics. As FIG. 2B shows, a computer system 102C may be operable to control one or more robotic arms 184, each comprising a sensor or camera 132, to scan an object 360. The computer system 102C may be operable to store and execute software implementing a scanning scheme according to the present invention. More specifically, the computer system 102B may be operable to store and execute one or more software programs to calculate one or more sample points based upon user input and/or sensor data. In one embodiment, the sample point calculations may be performed offline in a preprocessing phase. In another embodiment, part or all of the sample point calculations may be performed in real time. The computer system 102C may be further operable to store and execute software programs to maneuver the one or more robotic arms 184 and respective cameras 132 to implement the calculated sampling scheme.

In one embodiment of the system shown in FIG. 3C, multiple robotic arms may be used in tandem. In this case, a cooperative sampling strategy may be required which coordinates the movement of each arm 184 to collectively sample the object 360.

Figure 3D:
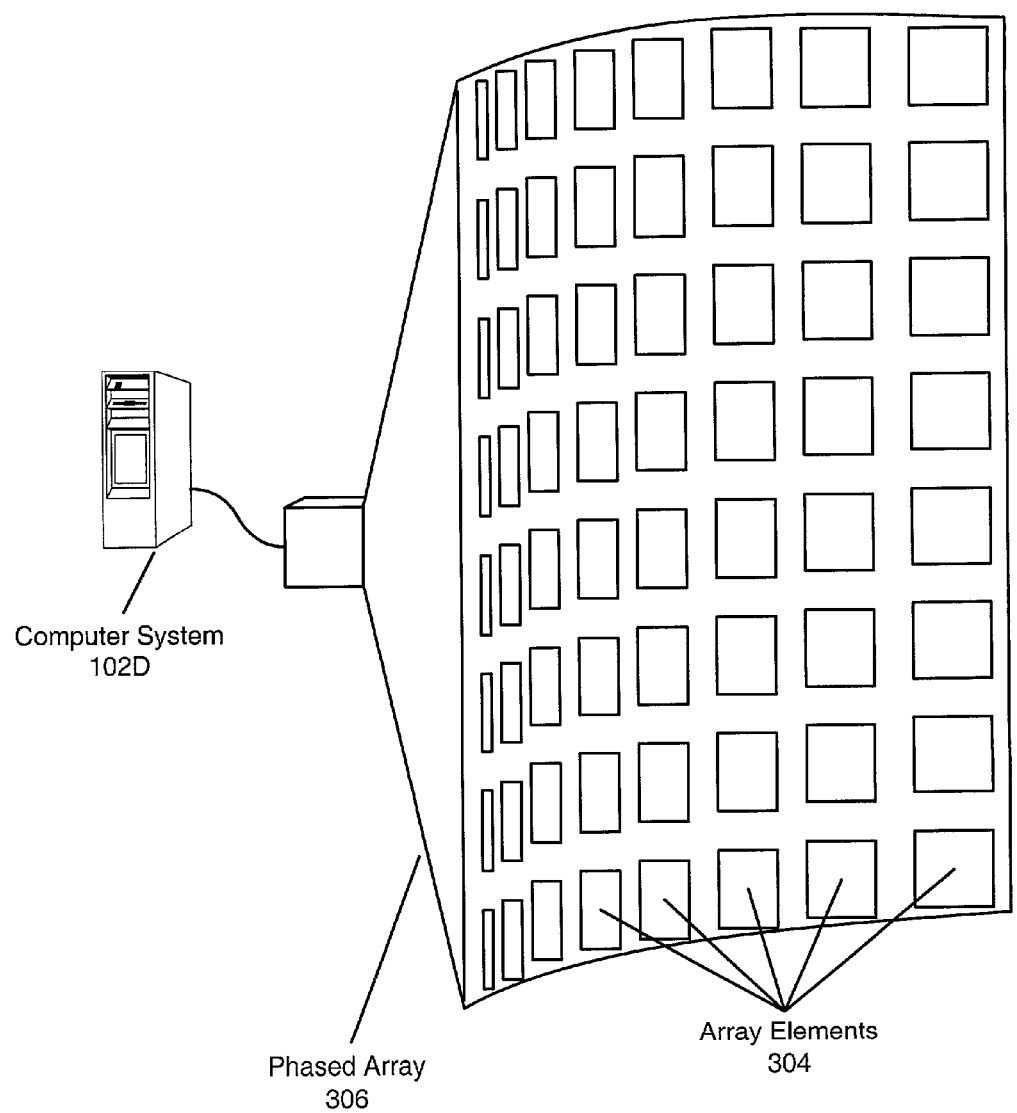
FIG. 3D illustrates a phased array control application of a scanning system, according to one embodiment of the present invention.

FIG. 3D—Phased Array Application of the Present Invention

FIG. 3D illustrates an example application of the present invention in the area of phased array control. A phased array typically refers to a group of antennas in which the relative phases of the respective signals feeding the antennas are varied in such a way that the effective radiation pattern of the array is reinforced in a desired direction and suppressed in undesired directions. As FIG. 3D shows, computer system 102D may couple to a phased array 302. The phased array 302 may comprise a plurality of array elements 304 which may each be controlled independently or in concert with the other array elements 304. The computer system 102D may store and execute software which is operable to control the phased array elements to accomplish a specific task. Other examples of controlled phased arrays include telescope farms and micro-mirror assemblies on fiber optic transfer chips.

Figure 3E:
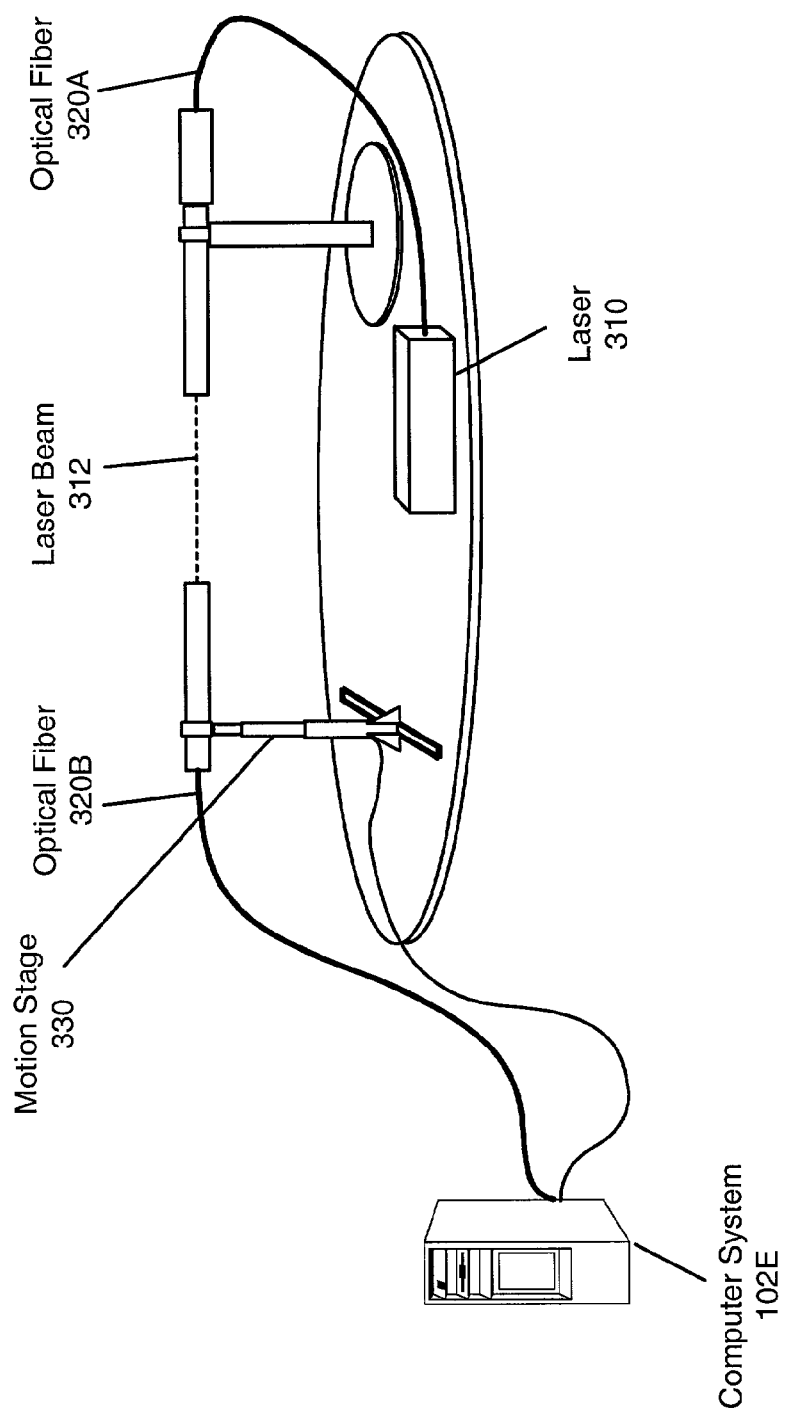
FIG. 3E illustrates an optical fiber alignment system, according to one embodiment of the present invention.

FIG. 3E—Optical Fiber Alignment Application of the Present Invention

FIG. 3E illustrates an example machine motion application where the goal is a fast procedure for precise alignment of two optical fibers. In this example application, a laser source 310 generates a beam 312 which is routed into a first fiber 320A and checked or measured through a second fiber 320B, where the intensity of the laser beam 312 may be measured or sampled at a number of points and the results used to align the two fibers 320. Further details of this example application are provided below with reference to FIG. 10.

Figure 4A:
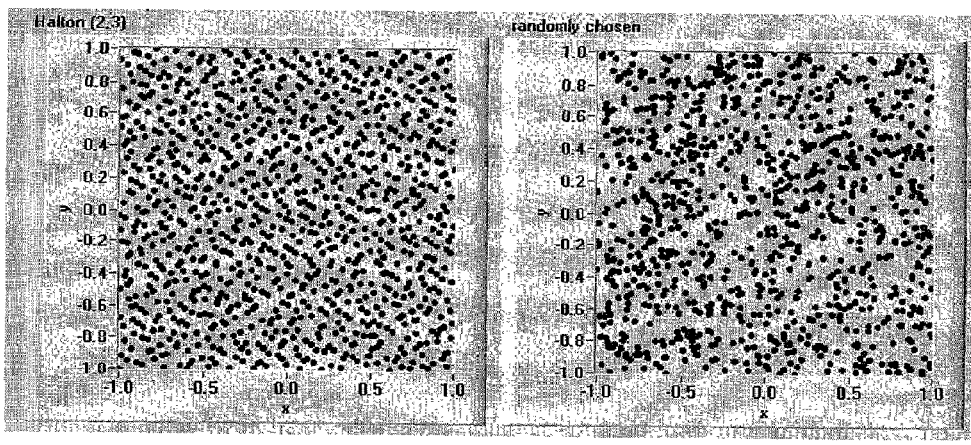
FIG. 4A illustrates a Halton Sequence and a random distribution of points.
Figure 4B:
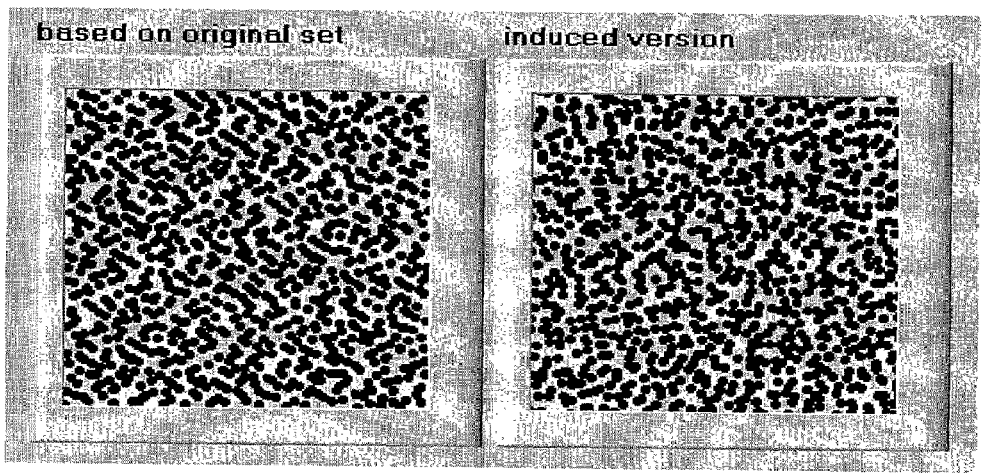
FIG. 4B illustrates a Low Discrepancy Sequence and an Induced Low Discrepancy Sequence, according to one embodiment.
Figure 4C:
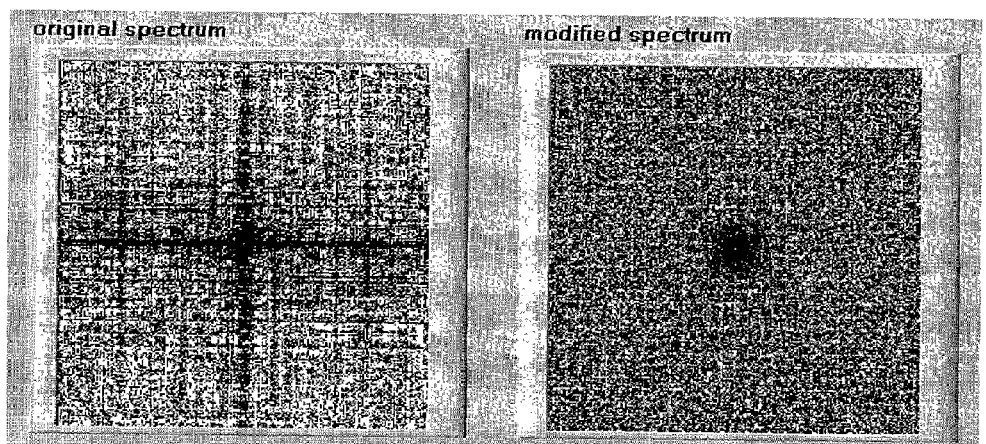
FIG. 4C illustrates Fourier Transforms of the Low Discrepancy Sequence and the Induced Low Discrepancy Sequence of FIG. 4B, according to one embodiment.

FIGS. 4A–4C—Low Discrepancy Sequences

Pseudo-random sequences have been used as a deterministic alternative to random sequences for use in Monte Carlo methods for solving different problems. Recently, it was discovered that there is a relationship between Low Discrepancy Sets and the efficient evaluation of higher-dimensional integrals. Theory suggests that for midsize dimensional problems, algorithms based on Low Discrepancy Sets may outperform all other existing methods by an order of magnitude in terms of the number of samples required to characterize the problem.

Given a function $f(x,)$ the problem of calculating the integral $$I(f) = \int_0^1 f(x)\,dx \qquad (3)$$

in the most efficient manner is not a well posed problem. An approximate strategy may be based on the following procedure:

(A) Construct an infinite sequence $\{x_1, x_2, x_3, \ldots, x, \ldots\}$ of real numbers in [0, 1] that does not depend on a specific function $f$ (nothing is known about $f$ in advance, except some general smoothness properties).

(B) During the $n^{th}$ step of the algorithm calculate $f(x_n)$ and the approximation to the integral in (3) as:

$$I_n(f)=(f(x_1)+ \ldots +f(x_n))/n \quad (4)$$

If a certain criterion is satisfied stop, else repeat step (B). The stopping criterion depends strongly on objectives such as accuracy or speed.

This algorithm differs from standard methods such as the trapezoidal rule which is based on equally distributed points in [0, 1] in that there is no relationship between consecutive sets $x_i(n)=i/n$ and $x_i(n)=i/(n+1)$. In other words, if the approximation given in equation (4) fails a design goal, a complete recalculation of numerous f-values is necessary. On the other hand, it is well known that the trapezoidal rule gives a $1/n^2$ rate of convergence for a given continuous function f.

Obviously, the quality of the trapezoidal rule is based on a highly homogeneous set of points. To quantify the homogeneity of a finite set of points, the definition of a discrepancy of a given set was introduced:

$$D(X) = \sup_R |m(R) - p(R)| \quad (5)$$

Here, R runs over all rectangles [0, r] with $0 \leq r \leq 1$, m(R) stands for the length r of the closed interval R, and p(R) is the ratio of the number of points of X in R and the number of all points of X. The definition given in equation (5) can be generalized to the case of d dimensions (d=2, 3, . . . ), where the term interval must be interpreted as a d dimensional rectangle. The lower the discrepancy the better or more homogeneous the distribution of the set. The discrepancy of an infinite sequence $X=\{x_1, x_2, \ldots, x_n, \ldots\}$ is a new sequence of positive real numbers $D(X_n)$, where $X_n$ stands for the first n elements of X. Other definitions for the discrepancy of a set exist that avoid the worst-case scenario according to (5).

There exists a set of points of given length that realizes the lowest discrepancy. It is well known in the art that the following inequality (6) holds true for all finite sequences X of length n in the d dimensional unit cube (the Roth bound, see Weisstein [1999] or Kocis and Whiten [1997]):

$$D(X) \geq B_d \frac{(\log n)^{(d-1)/2}}{n}. \quad (6)$$

$B_d$ depends only on d. Except for the trivial case d=1, it is not known whether the theoretical lower bound is attainable. Many schemes to build finite sequences X of length n do exist that deliver a slightly worse limit $$D(X) \leq B_d \frac{(\log n)^d}{n}. \quad (7)$$

There are also infinite sequences X with $$D(X_n) \leq B_d \frac{(\log n)^d}{n} \quad (8)$$

for all for all sub-sequences consisting of the first n elements. The latter result gave rise to the definition of the Low Discrepancy (infinite) Sequences X. The inequality in equation (8) must be valid for all sub-sequences of the first n elements, where $B_d$ is an appropriately chosen constant. Low Discrepancy Sequences are also known as quasi-random sequences.

Many of the well-studied low-discrepancy sequences in d-dimensional unit cubes (also referred to as unit n-cubes, where n is the dimensionality) can be constructed as combinations of 1-dimensional low-discrepancy sequences. The most popular low-discrepancy sequences are based on schemes introduced by Corput [1937], Halton [1960], Sobol [1967], and Niederreiter [1992].

The relationship between integrals, approximations, and an infinite sequence $X=\{x_1, x_2, \ldots\}$ in n dimensions is given by the Koksma-Hlawka inequality.

$$|I(f) - I_n(f)| \leq V(f) \cdot D(X_n) \quad (9)$$

$$I(f) = \int_0^1 dx f(x)$$

$$I_n(f) = \frac{1}{n}\sum_{i=1}^n x_n$$

where V(f) is the variation of f in the sense of Hardy and Krause. For more information regarding Low Discrepancy Sequences, please see the book "Random Number Generation and Quasi-Monte Carlo Methods", by H. Niederreiter, CBMS-NSF Regional Conference Series in Applied Math., No.63, SIAM, 1992, which gives a comprehensive introduction into the implementation of Low Discrepancy Sequences (Halton and Sobol'). The Halton method is described in detail below. All of the test results presented are based on Halton sequences.

Halton sequences in 1-d start with the choice of a natural number greater than 1. Though not absolutely necessary, prime numbers p=2, 3, 5, . . . are typically chosen. If p is a given prime number and $x_n$ the $n^{th}$ element of the Halton sequence, the following algorithm determines $x_n$.

(A) write n down in the p-ary system $$n=n_q \ldots n_0, n=n_0+n_1 \cdot p+ \ldots +n_q \cdot p^q$$

(B) reverse the order of the digits and add the p-ary point $$0.n_0 n_1 \ldots n_q$$

(C) it is $$x_n=n_0 \cdot p^{-1}+n_1 p^{-2}+ \ldots +n_q p^{-(q+1)}$$

The $n^{th}$ element of the Halton sequence can be calculated independently of all other elements. As mentioned above, in d dimensions one has to interpret different 1-dimensional Halton sequences as coordinates of points in d dimensions. It is very common to start with the first d prime numbers.

FIG. 4A shows the first 1000 elements of a Halton sequence (left) in the unit square (a unit n-cube of dimension 2, i.e., n=2) for a valid choice of starting prime numbers, namely (2, 3). The graph on the right hand side is constructed with the aid of uniformly distributed random numbers. The differences are pronounced, as may be seen.

Halton sequences in 1-D are Low Discrepancy Sets in the sense of equation (8). More precisely, for all n and for all Halton sequences X that are based on a prime number p:

$$D(X) \le C_p \frac{\log n}{n} \text{ with}$$

$$C_p = \begin{cases} \frac{p^2}{4(p+1)\log p} & \text{when } p \text{ is even} \\ \frac{p-1}{4\log p} & \text{when } p \text{ is odd} \end{cases} \quad (10)$$

A similar result holds true for Halton sequences in d dimensional unit squares. In a 2-dimensional unit square for the (p,q) Halton sequence with prime numbers p and q the discrepancy is $$D(X) \le \frac{2}{n} + \frac{(\log n)^2}{n}\left[\left(\frac{p-1}{2\log p} + \frac{p+1}{2\log n}\right)\left(\frac{q-1}{2\log q} + \frac{q+1}{2\log n}\right)\right] \quad (11)$$

FIGS. 4B and 4C—Induced Point Distributions

The question arises whether an area-preserving map up to a constant factor from $[0,1]^2$ onto an abstract surface S can be found. Based on such mapping, a set of points defined in $[0,1]^2$ could be transformed onto the abstract surface, preserving low discrepancy in the sense of the metric defined for the surface. Therefore, given a nonnegative function $\Psi(u,v)$ defined on $[0,1]^2$ are there functions $f(u,v)$, $g(u,v)$ and a constant c with $$\frac{\partial f(u,v)}{\partial u}\frac{\partial g(u,v)}{\partial v} - \frac{\partial f(u,v)}{\partial v}\frac{\partial g(u,v)}{\partial u} = c\Psi(u,v) \quad (8)$$

where (f,g) is a diffeomorphism of $[0,1]^2$? It is shown below that under certain conditions this choice is always possible.

Theorem 1: Let $\Psi(u,v)$ be a nonnegative function on $[0,1]^2$ where $\Psi^2$ is continuously differentiable. Let $\Psi(u,v)$ be positive with exception of a set L of points (u,v) of Lebesgue-measure 0. For $(u, v) \notin L$ let $$f(u,v) = \frac{1}{\int_0^1 du \Psi(u,v)} \int_0^u du \Psi(u,v) \quad (9)$$

$$g(u,v) = g(v) = \frac{1}{\int_0^1 \int_0^1 du dv \Psi(u,v)} \int_0^1 \int_0^v du dv \Psi(u,v)$$

Furthermore, let the functions f and g be extendable to continuously differentiable mappings defined on $[0,1]^2$. Then the extension functions (f,g) define a diffeomorphism of $[0,1]^2/L$ where (8) is always valid.

It is noted that the set of points L refers to the few points which are not well-behaved, and so are excluded from consideration.

Proof: The denominators in (9) are positive. The extensions of f and g map $[0,1]^2$ onto $[0,1]$ and are continuously differentiable. g(v) is strictly monotone in v (the Lebesgue-measure of L is 0). For $(u, v) \notin L$, $$\frac{\partial f(u,v)}{\partial u}\frac{\partial g(u,v)}{\partial v} - \frac{\partial f(u,v)}{\partial v}\frac{\partial g(u,v)}{\partial u} =$$

$$\frac{\partial f(u,v)}{\partial u}g'(v) = \frac{1}{\int_0^1 \int_0^1 du dv \Psi(u,v)}\Psi(u,v)$$

g(u,v)=g(u',v') implies v=v' and from f(u,v)=f(u'v) it follows that u=u'. q.e.d.

Theorem 1 allows the construction of well-distributed sets D of points on $R^n$ that are embeddings of abstract surfaces. The procedure is based on given distributions of sets in $[0,1]^2$. An $R^n$ embedding of an abstract surface (1) is a mapping $x(u,v)=(x_1(u,v), x_2(u,v), \ldots, x_n(u,v))$ with $E=x_u x_u$, $F=x_u x_v$, and $G=x_v x_v$. All functions $x_k$ are differentible.

The algorithm is straightforward:

Algorithm I:
(I.1) Given an abstract surface S defined on $[0,1]^2$ where $\Psi(u,v)$ satisfies the propositions of Theorem 1. In addition, let be given an embedding x(u,v) of S in $R^m$.
(I.2) According to Theorem 1 a diffeomorphism (f(u,v),g(u,v)) of $[0,1]^2/L$ is constructed.
(I.3) Compute the inverse transform $(f^{-1}(u,v), g^{-1}(u,v))$.
(I.4) Let D be a well-distributed set in $[0,1]^2$. The image of D under the transform $x(f^{-1}(u,v), g^{-1}(u,v))$ forms a well-distributed set lying on the aforementioned embedding in $R^m$.

Because of (8) the latter transform preserves areas (up to a constant factor). In particular, (I.1)–(I.4) provides a method to preserve low-discrepancy properties. The algorithm (I.1)–(I.4) also produces a new abstract surface:

$$ds^2 = E(f(u,v),g(u,v))du^2 + 2F(f(u,v),g(u,v))dudv + G(f(u,v),g(u,v))dv^2$$

where the resulting area element $dA^2$ is independent of u and v. Note that this expression denotes a Riemannian metric for the abstract surface, where, as those skilled in the art know, is a generalization of the concept of Euclidean distance.

One of the simplest examples is the abstract surface defined by $$ds^2 = du^2 + u^2 dv^2$$

There is an embedding in $R^2$, $x(u,v)=(u \cos(2\pi v), u \sin(2\pi v))$. This embedding is simply a unit circle in polar coordinates, it is $\Psi(u,v)=u$. Steps (I.1)–(I.4) deliver the diffeomorphism $(f(u,v), g(u,v))=(u^2,v)$, i.e. $(f^{-1}(u,v), g^{-1}(u,v))=(sqrt(u),v)$ which, of course, produces a new parameterization (sqrt(u)cos(2πv), sqrt(u)sin(2πv)) of the given circle.

FIG. 4B compares a low-discrepancy set derived from such a sequence in $[0,1]^2$ (i.e. discarding those points in $[0,1]^2$ that are outside the circle) with the image of such a sequence under an induced transform. In both cases, a rectangular region in proximity to the center of an circle is depicted. The distributions look alike, however FIG. 4C reveals that the Fourier transforms are remarkably different; pronounced orientation dependence in the first case and smooth frequency behavior in the latter case. Additionally, the first approach based on derived low-discrepancy sets in $[0,1]^2$ suffers from serious drawbacks in higher dimensional spaces. For example, in high dimensional spaces, the fraction of points outside the n-sphere approaches 1, and so the vast majority of the generated points are not usable, resulting in substantial inefficiencies.

A more sophisticated example is a part of a sphere given as an abstract surface by $$ds^2 = \cos^2(v)du^2 + dv^2 \text{ where } (u,v) \text{ is located in } [0,1]^2.$$

An $R^3$ embedding is $x(u,v)=(\cos(u)\cos(v),\sin(u)\cos(v),\sin(v))$. Algorithm (I.1)–(I.4) produces the diffeomorphism $(f(u,v),g(u,v))=(u,\sin(v)/\sin(1))$, i.e. $(f^{-1}(u,v),g^{-1}(u,v))=(u, \text{arc sin}(\sin(1)v))$. Thus, a Low Discrepancy Sequence of points defined on the unit square may be mapped onto the sphere in a manner that preserves the Low Discrepancy attributes of the sequence.

Figure 5A:
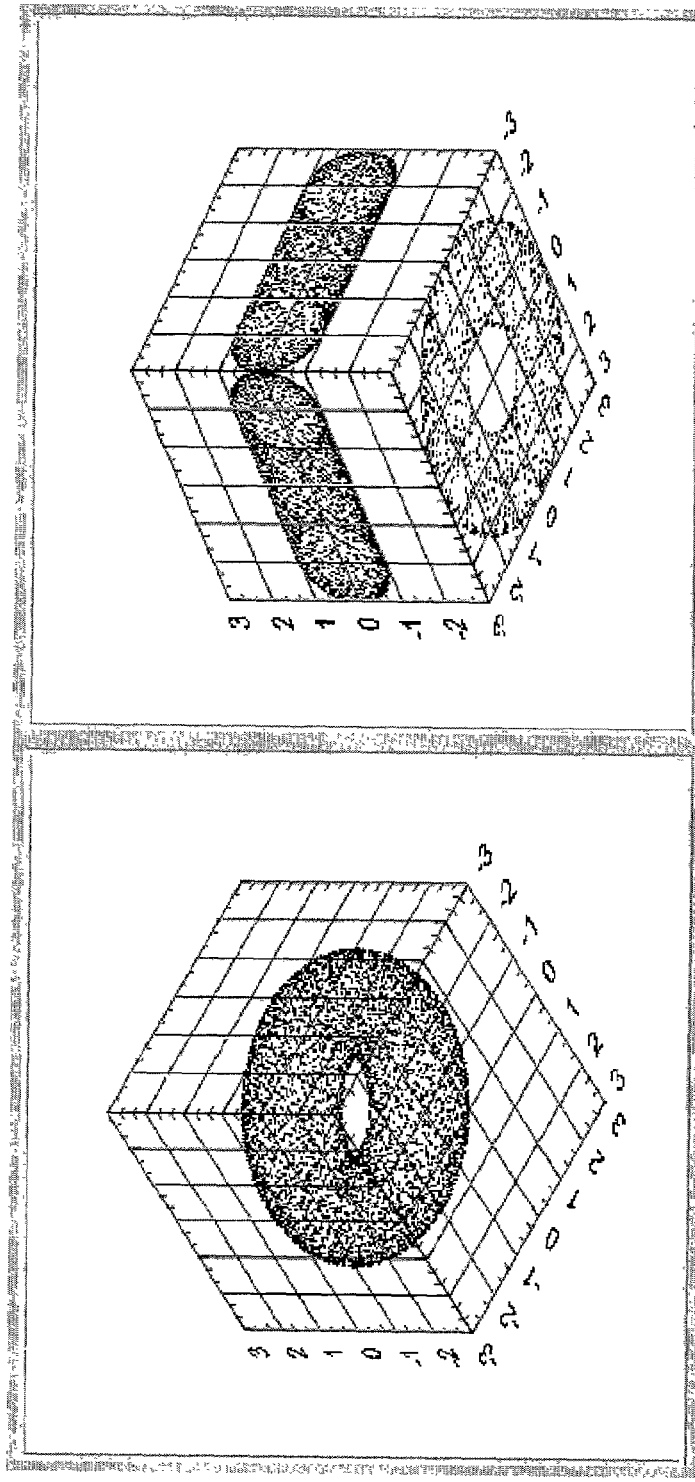
FIG. 5A illustrates a well-distributed point set on the surface of a torus, according to one embodiment.

FIG. 5A—Example: Induced Point Set on a Torus

Another example deals with the surface of a torus. The $R^3$ embedding and the abstract surface have the descriptions (where b<a):

$$x(u,v)=((a+b\cos(2\pi v))\cos(2\pi u),(a+b\cos(2\pi v))\sin(2\pi u),b\sin(2\pi v))$$

$$ds^2 = 4\pi^2(a+b\cos(2\pi v))^2 du^2 + 4\pi^2 b^2 dv^2$$

Algorithm (I.1)–(I.4) Delivers $$(f(u,v), g(u,v)) = \left(u, v + \frac{b}{2a\pi}\sin(2\pi v)\right).$$

After computing the inverse transform, homogeneous point sets lying on the surface of a torus can be generated. FIG. 5 shows such a distribution and projections onto different planes. As FIG. 5 clearly shows, the induced point set is distributed homogeneously over the surface.

Higher Dimensional Riemannian Geometries

In 3- or n-dimensional Riemannian geometries the term area preserving may be replaced with volume preserving or content preserving.

Volume or content preserving mappings (up to a constant factor) are characterized by $$\Psi(u_1, \ldots, u_n) = \sqrt{det(g_{ij}(u_1,\ldots,u_n))} = \text{const.} \quad (10)$$

It is natural to generalize Theorem 1 in the following manner.

Theorem 2: Let $\Psi(u_1,u_2,\ldots,u_n)$ be a nonnegative function on $[0,1]^n$ where $\Psi^2$ is continuously differentiable. Let $\Psi(u_1,u_2,\ldots,u_n)$ be positive with exception of a set L of points $(u_1,u_2,\ldots,u_n)$ of Lebesgue-measure 0. For $(u_1,u_2,\ldots,u_n) \notin L$ let $$f_1(u_1, u_2, \ldots, u_n) = \frac{\int_0^{u_1} du_1 \Psi(u_1, \ldots, u_n)}{\int_0^1 du_1 \Psi(u_1, \ldots, u_n)}$$

$$\ldots$$

$$f_{n-1}(u_{n-1}, u_n) = \frac{\int_0^{u_{n-1}} \int_0^1 \ldots \int_0^1 du_1 \ldots du_{n-1}\Psi(u_1, \ldots, u_n)}{\int_0^1 \int_0^1 \ldots \int_0^1 du_1 \ldots du_{n-1}\Psi(u_1, \ldots, u_n)}$$

$$f_n(u_n) = \frac{\int_0^{u_n} \int_0^1 \ldots \int_0^1 du_1 \ldots du_n \Psi(u_1, \ldots, u_n)}{\int_0^1 \int_0^1 \ldots \int_0^1 du_1 \ldots du_n \Psi(u_1, \ldots, u_n)}$$

Furthermore, let the functions $f_1, \ldots, f_n$ be extendable to continuously differentiable mappings defined on $[0,1]^n$.

Then the extension functions $f=(f_1, f_2, \ldots, f_n)$ define a diffeomorphism of $[0,1]^n/L$ where (10) is always valid.

Proof: The specific structure of these functions simplifies the determinant of the Jacobian of f to exactly one product $$\frac{\partial f_1(u_1, \ldots, u_n)}{\partial u_1} \frac{\partial f_2(u_2, \ldots, u_n)}{\partial u_2} \ldots \frac{\partial f_n(u_n)}{\partial u_n}$$

The rest is similar to proof of Theorem 1.

q.e.d.

Algorithm I may be generalized to n dimensions as follows:

Algorithm II:

(II.1) Given an abstract surface S defined on $[0,1]^n$ where $\Psi(u_1,u_2,\ldots,u_n)$ satisfies the propositions of Theorem 2. Furthermore, let be given an embedding $x(u_1,u_2,\ldots,u_n)$ of S in $R^m$, where m>n.

(II.2) According to Theorem 2 a diffeomorphism $f(u_1,\ldots,u_n)=(f_1(u_1,\ldots,u_n),\ldots,f_n(u_1,\ldots,u_n))$ of $[0,1]^n$ is constructed.

(II.3) Compute the inverse transform $f^{-1}(u_1,\ldots,u_n)$.

(II.4) Let D be a well-distributed set in $[0,1]^n$. The image of D under the transform $x(f^{-1}(u_1,\ldots,u_n))$ forms a well-distributed set lying on the aforementioned embedding in $R^m$.

Figure 5B:
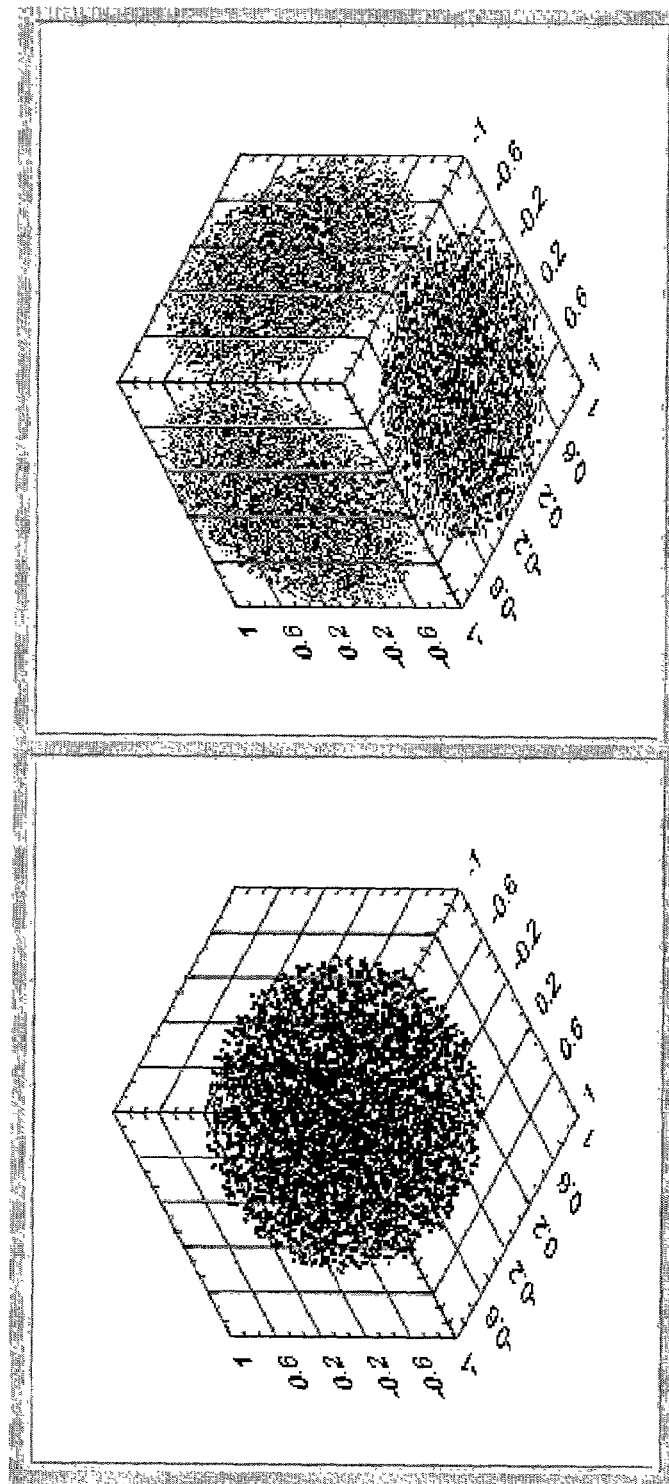
FIG. 5B illustrates a well-distributed point set in a unit ball, according to one embodiment.

FIG. 5B—Example: Induced Point Set in a Unit Ball in n-Dimensional Euclidean Space FIG. 5B illustrates an induced point set in a unit ball embedded in an n-dimensional (n=3) Euclidean space. Given the unit ball in n-dimensional Euclidean space in standard parameterization $$f(u_1, \ldots, u_n) = u_n(\sin(2\pi u_1)\sin(\pi u_2) \ldots \sin(\pi u_{n-1}),$$

$$\cos(2\pi u_1)\sin(\pi u_2) \ldots \sin(\pi u_{n-1}) \ldots, \cos(\pi u_{n-2})\sin(\pi u_{n-1}), \cos(\pi u_{n-1}))$$

it turns out that $$\Psi(u_1, \ldots, u_n)^2 = 4(\pi^2 u_n^2)^{n-1}\sin^2(\pi u_2)\sin^4(\pi u_3) \ldots \sin^{2(n-2)}(\pi u_{n-1}).$$

Applying Theorem 2 leads to functions $$f_k(u_1, u_2, \ldots, u_n) = \frac{\int_0^{u_k} du_k |\sin^{k-1}(\pi u_k)|}{\int_0^1 du_k |\sin^{k-1}(\pi u_k)|} \text{ for } k = 1, 2, \ldots, n-1$$

$$f_n(u_1, u_2, \ldots, u_n) = u_n^n$$

The functions $f_k$ depend only on $u_k$ and can easily be inverted.

It is worthwhile to note that the alternative approach of deriving a well-distributed set based on the surrounding unit n-cube suffers from serious limitations. The content or volume of such an n cube is 1, the content of an n-dimensional unit ball is $$\frac{\sqrt{\frac{\pi}{4}}}{\Gamma(n/2+1)}$$

which is on the order of $1/n^{n/2}$. In other words, the probability to hit the n ball is extremely small when n is beyond 10. Said another way, the volume in the unit cube which is outside the unit ball is in the corners of the cube. The higher the dimensionality of the unit n-cube, the more corners there are, thus the smaller the ratio of the ball volume to the n-cube volume.

Figure 6:
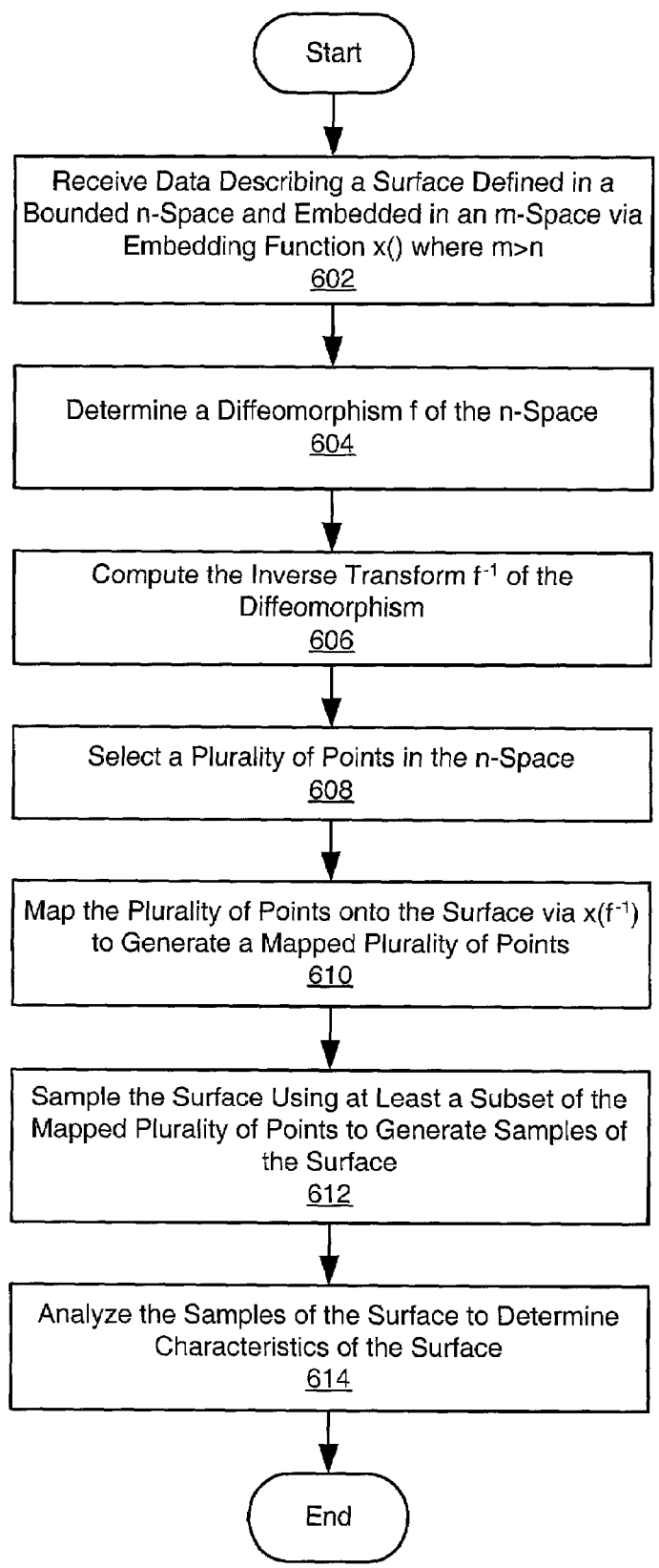
FIG. 6 flowcharts a method for analyzing a surface using a mapped sequence of sample points, according to one embodiment.

FIG. 6—Flowchart of a Method for Generating a Low Discrepancy Sequence on a Manifold FIG. 6 is a flowchart one embodiment of a method for generating a sequence, such as a Low Discrepancy Sequence, on a surface or manifold, e.g., on an abstract surface. Specifically, an embodiment of the method is described in which a sequence or point set, e.g., a Low Discrepancy Sequence, is generated on an n-dimensional space, for example, a unit square, then mapped to the manifold, although it is also contemplated that other sequences of points may be mapped in a similar manner, and that regions other than the unit n-square may be used. In one embodiment, the manifold may be a Riemannian manifold. In other words, the manifold may be characterized by a distance-like metric. It should be noted that in various embodiments, one or more of the steps may be performed in a different order than shown, or may be omitted as desired. Furthermore, additional steps may be performed as desired.

As FIG. 6 shows, in 602 data may be received describing a surface which is defined in a bounded n-dimensional space, also referred to as a bounded n-space. The data may comprise data values or a plurality of points on the surface. For example, in an image processing application, the received data may comprise pixel data corresponding to an acquired image. In a seismic signal processing application, the received data may comprise acoustic signal strengths on the surface or interior of a volume. In a financial application, the received data may comprise company stock metrics such as stock price, price/earnings ratios, earnings, and volatility, among others. Similarly, the received data may include futures data such as pricing, term information, and volume, among others. In a medical application, for example, the received data may include 2- or 3-dimensional image data for x-ray charts, positron emission tomography, computer-aided tomography, nuclear magnetic resonance, ultra-sound, or other medical images and data sets. In another medical application the received data may include Electro-Cardiogram (EKG) and Electro-Encephalogram (EEG) data. In a more abstract medical application, the received data may include multi-dimensional diagnostic metrics. In a robotics application the received data may include degrees of freedom information regarding the operation of one or more robotic arms. In a computer aided identification application the received data may include biometric data such as fingerprint data, facial structure metrics, ambulatory metrics (gait information), voice data, and image data, among others. In a geographic application the received data may include altitude data, image data representing terrain features such as temperature, moisture, reflectance, ground cover, urbanization, or any other terrain feature. It is noted that in each of these fields, as well as others, there are applications of the present invention too numerous to mention.

In one embodiment, the bounded n-dimensional space may comprise a unit square. In another embodiment, the bounded n-dimensional space may comprise a unit cube. As mentioned above, in various other embodiments, the bounded n-dimensional space may comprise other geometries, including unit hyper-cubes, or unit n-cubes of dimensionalities greater than 3, as well as n-dimensional rectangles, spheres, or any other geometrical region. In one embodiment, the surface may further be embedded in an m-dimensional space, where m>n. In other words, the surface may be parameterized in terms of a higher dimensional space according to an embedding function x( ).

In one embodiment, the received data may include a Riemannian metric characterizing the surface or manifold. In another embodiment, the surface may comprise an image, and the received data may comprise an intensity function describing the image, e.g., describing pixel information of the image.

In 604, a diffeomorphism f of the bounded n-space may be determined. As is well known in the art, a diffeomorphism may be considered a mapping between two spaces which preserves differentiability of a mapped function. It is noted that the diffeomorphism f may in some embodiments be comprised of other functions, i.e., f may be a compound or concatenated function.

In 606, an inverse transform $f^{-1}$ of the diffeomorphism determined in 604 may be computed.

Then, as indicated in 608, a plurality of points in the bounded n-space may be selected or determined. In one embodiment, the plurality of points may comprise a Low Discrepancy Sequence. It should be noted that although selection of a Low Discrepancy Sequence of points is an exemplary use of the method, any other point set may be used as desired.

In 610, in response to the selection of the plurality of points in 608, the plurality of points may be mapped onto the surface via $x(f^{-1})$ to generate a mapped plurality of points, e.g., a mapped Low Discrepancy Sequence. Note that the function $x(f^{-1})$ may be a functional concatenation of the embedding function x( ) of 602 and the inverse transform of the diffeomorphism, $f^{-1}$ of 606.

In 612, the surface may be sampled or measured using at least a subset of the mapped plurality of points. In other words, measurements may be made at one or more of the mapped plurality of points, thereby generating one or more samples of the surface.

Finally, in 614 the generated samples of the surface may be analyzed to determine one or more characteristics of the surface. For example, in one embodiment, the surface may comprise a surface of an object, and the analyzing may comprise analyzing the samples of the surface to determine one or more characteristics of the object. In a manufacturing quality control application, the object may be a circuit card, and the surface of the circuit card may be sampled and analyzed to determine whether all of the components on the card are in the correct location and/or orientation. In a computer aided identification application the surface may be a human face which may be analyzed to determine an identity of the human. In an image processing application, the surface may comprise a color or gray-scale image which may be analyzed for feature detection, recognition, and characterization. In a geographic application the surface may comprise terrain (data) which may be analyzed to determine features such as altitude, temperature, moisture, reflectance, ground cover, urbanization, or any other terrain feature.

In many applications the surface and/or object may be an abstract surface or object, such as a data set describing a phenomenon or relationship. For example, in a seismic signal processing application, acoustic signal strengths on the surface or interior of a volume may be analyzed to determine the presence of geologic structures indicative of oil or mineral deposits. In a financial application, company stock metrics such as stock price, price/earnings ratios, earnings, and volatility, among others, may be analyzed to determine characteristic patterns or formations indicating buy or sell conditions. Similarly, futures data such as pricing, term information, and volume, among others, may be analyzed to determine expected values for given contracts.

In a medical application, for example, 2- or 3-dimensional image data for x-ray charts, positron emission tomography, computer-aided tomography, ultra-sound, or other medical images and data sets may be sampled and analyzed for diagnostic purposes. In other words, specific patterns or features may be detected and characterized to diagnose a medical condition. For example, EKG data may be analyzed to characterize the health of a patient's heart, e.g., to determine the likelihood of a heart attack. Similarly, EEG data may be analyzed to determine brain function (or mal-function) indicating brain pathologies, such as the presence of a tumor. It is also noted that non-pathological aspects of the body may be researched using various embodiments of the present invention, such as blood flow, neurological activity, or other physiological metrics. In other words, the present invention also lends itself to research, as opposed to being restricted in use for diagnostics. In a more abstract medical application, multi-dimensional diagnostic metrics in an abstract space may be analyzed, and pattern matching algorithms used to diagnose complex multi-system health conditions or functionality in a patient.

In a robotics application degrees of freedom information regarding the operation of one or more robotic arms may be analyzed to determine efficient motion paths through spaces with complex constraints, such as robotically aided microsurgery or tele-surgery, where a surgeon (or software program) at one location manipulates surgical robotic arms to perform surgery on a patient at a second location.

In another machine vision application, an autonomous robot may map terrain information into an abstract space to simplify obstacle avoidance methods. In other words, certain algorithms for characterizing and/or avoiding obstacles may be substantially simplified by mapping the terrain data prior to analysis. This may result in real time performance of algorithms not feasible otherwise.

It should be noted that in some embodiments, the mapped plurality of points, e.g., the mapped Low Discrepancy Sequence, may simply be output for later use by the system or by other systems. In other words, the sampling and/or analyzing of 612 and 614 may be performed by other systems, or at a later time. In one embodiment, outputting the mapped points (e.g., the mapped Low Discrepancy Sequence) may comprise storing the sequence for later use. In another embodiment, outputting the mapped Low Discrepancy Sequence may comprise displaying the sequence on a display device.

Thus, by using the above-described method, a plurality of points, e.g., a Low Discrepancy Sequence, generated on a unit square (or other suitable geometry) may be mapped to a surface, such as an abstract surface or manifold. It should be noted that any point set generated on the unit square (or other suitable geometry) may be mapped in this way.

In one embodiment, the surface may comprise an image, and the sampling may comprise sampling the image to generate samples of the image. It should be noted that in this embodiment, sampling may not necessarily involve measurement with a sensor, but rather, may refer to calculation of an intensity value (or other pixel-related quantity) based on a function, e.g., an intensity function. In another embodiment, the sampling may involve reading pixel data from an image file. The computed samples may then be analyzed to determine characteristics of the image. In one embodiment, the image may comprise information related to an object, where the analyzing may be performed to determine one or more characteristics of the object.

In one embodiment, the above method may be used to generate a scan path for a scanning application, such as a six degree of freedom alignment problem, for example, as described below in the section titled Example Applications. Other applications may include determination of scanning sequences for one or more robotic arms, where the scan space may describe degrees of freedom for the robotic arms, among others. For example, the scan space for the robotic arm may be a 6-dimensional space representing 3 positional degrees of freedom, and 3 directional or orientation degrees of freedom. Alternately, the degrees of freedom may relate to the degrees of freedom of joints or other articulated components of the arm. In one embodiment, the robotic arm may include a directional sensor, and the sampling may include measuring a vector field at one or more of the mapped plurality of points. One example of such an application relates to the location of an acoustic source via discrete sampling of sound strength and direction, such as by a directional microphone.

It should be noted that such examples are meant to be illustrative, and are not intended to limit the domain of applicability of the method.

EXAMPLE APPLICATIONS

Exploration of an Unknown Higher Dimensional Space

In some cases the geometry of an underlying space may be unknown. An example is given by a car seat which has six degrees of freedom. In this example, some combinations of movement are valid and others are invalid. The goal is a description of this space in terms of valid combinations (6 coordinates each). Critical points in this space may be determined by efficient exploration of the space through the use of a Low Discrepancy Sequence.

Direction Dependent Sensing in 3d

A typical scanning problem arises when electromagnetic, acoustic, or other fields must be explored where the sensor works in a direction-selective manner and can be moved freely, e.g. the point of maximal strength of an acoustic field in a given room must be determined and the microphone must be directed to take a measurement. From a purely scanning standpoint, a 6-dimensional space must be scanned efficiently. Low-discrepancy Sequences in 6d will detect this point faster on average than other methods. Moreover, standard techniques such as grid-like scanning methods are almost unrealizable because of the unbalanced structure of these sequences.

Integration

As mentioned above, one of the most straightforward applications for Low Discrepancy Sequences are calculations of integrals of smooth functions defined on Riemannian geometries embedded in $R^m$. The replacement of integrals by sums of function values of well-chosen sampling points offers the same advantages as those based on low-discrepancy sets defined in unit cubes.

Image Processing

Another application field for Low Discrepancy Sequences is image processing. Assume the intensity of an image is described by $I(u,v)$ where $(u,v)$ fills the unit square. Furthermore, let $I(u,v)$ be sufficiently smooth in u and v. Such an image can be reinterpreted as a surface (u,v,I(u,v)) and Theorem 1 can be applied. The Riemannian metric belonging to I(u,v) is $$ds^2 = \left(1 + \left(\frac{\partial I(u,v)}{\partial u}\right)^2\right)du^2 + 2\frac{\partial I(u,v)}{\partial u}\frac{\partial I(u,v)}{\partial v}dudv + \left(1 + \left(\frac{\partial I(u,v)}{\partial v}\right)^2\right)dv^2$$

Therefore, $$\Psi(u,v) = \sqrt{1 + \left(\frac{\partial I(u,v)}{\partial u}\right)^2 + \left(\frac{\partial I(u,v)}{\partial v}\right)^2} \quad (11)$$

The resulting diffeomorphism (f(u,v),g(u,v)) represents information contained in I(u,v). In applications, the integrals are replaced with sums of function values. More importantly, the inverse diffeomorphism in conjunction with appropriate sampling strategies in $[0,1]^2$ allows an induced sampling of a given image content. Thus, an image may be considered an abstract Riemannian surface or manifold.

It should be noted that, although the image described above is a two-dimensional image, higher dimensional images are also contemplated. For example, complex multi-dimensional data sets may be considered images, and the methods described herein may be used to explore and characterize the data sets, or objects and features contained therein.

Algorithm III:
(III.1) Compute (11) where I is a given image (e.g. gray-levels).
(III.2) Determine the inverse diffeomorphism according to Theorem 1.
(III.3) Choose a Low Discrepancy Sequence in $[0,1]^2$.
(III.4) Compute the image sequence of this Low Discrepancy set under the diffeomorphism mentioned in (III.2).

The intensity values of I at these points (the mapped Low Discrepancy Sequence) describe the image content in an efficient manner and can be used to compress an image or to characterize its content. To a certain extent, the resulting description can be regarded as a generalized edge detector that may be highly optimized for a specific image. Potential applications can be found in pattern matching where a given template should be characterized by a small amount of pixels, to speed up successive search operations. The use of low-discrepancy sets offers the advantages mentioned before.

Figure 7:
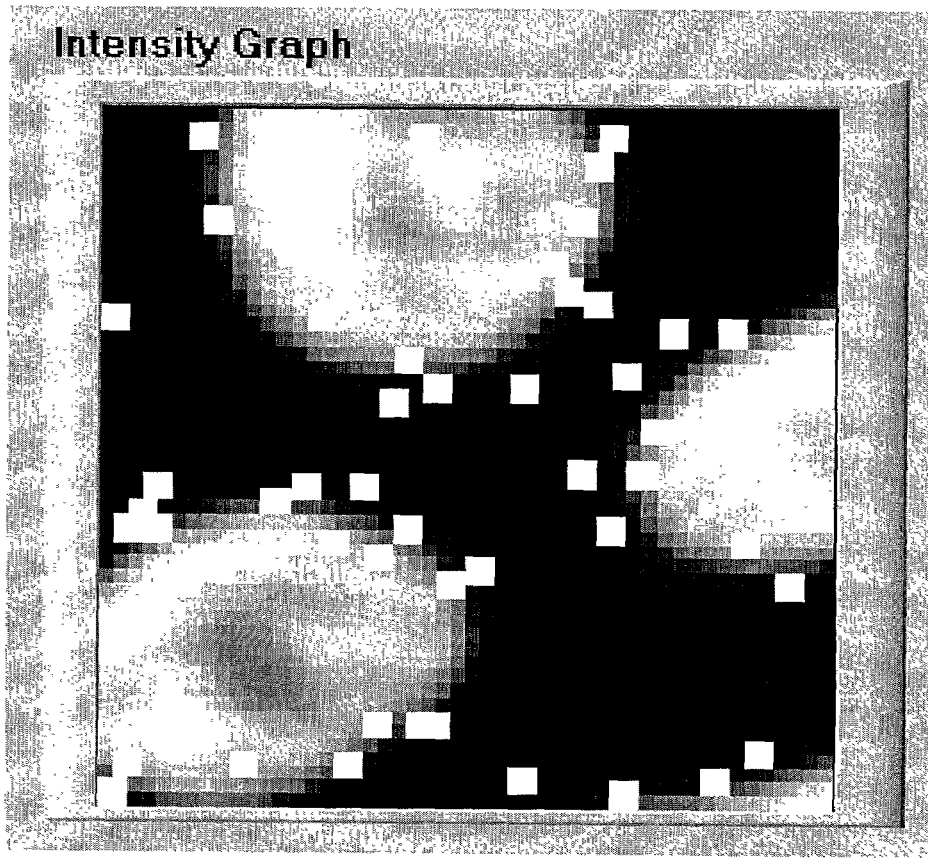
FIG. 7 illustrates edge detection in an image, according to one embodiment of the present invention.

FIG. 7 demonstrates the effect of Algorithm III on a given image. The small rectangles represent the sampling points computed by Algorithm III. As FIG. 7 shows, the algorithm identifies the edges and other significant points. Other examples of image processing tasks suitable for various embodiments of the present invention include pattern or object recognition and/or detection, and object characterization, among others.

Figure 8:
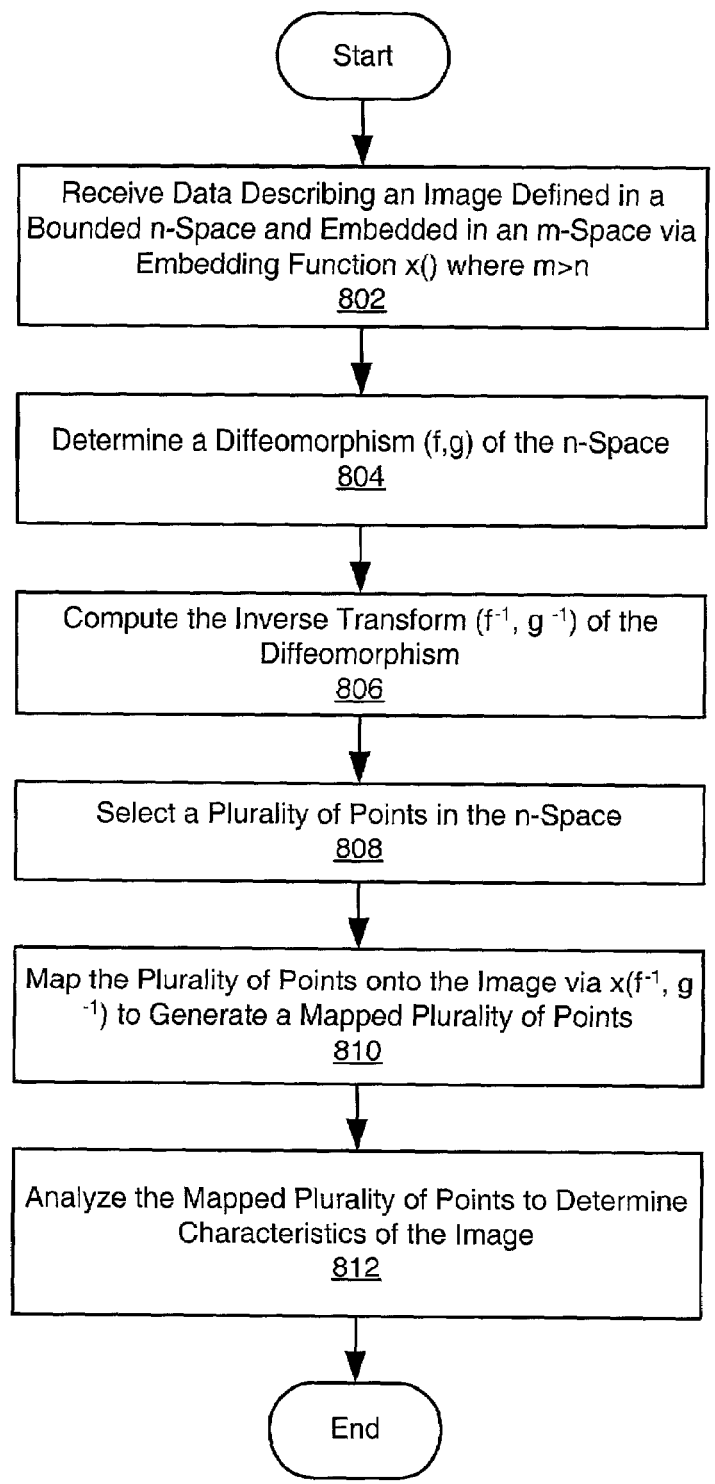
FIG. 8 flowcharts a method for analyzing an image using a mapped sequence of points, according to one embodiment.

FIG. 8—Flowchart of a Method for Image Processing

FIG. 8 flowcharts one embodiment of a method for processing and analyzing an image. It should be noted that as used herein, the term "image" may refer not only to a 2-dimensional image, but to a higher dimensional image, e.g., images of 3-dimensions or more, as well. Examples of 3-dimensional images include 3d medical images, and 3d seismic images, among others. It is also contemplated that data sets represented by even higher dimensional images (4d and above) may be characterized by various embodiments of the present invention. In other words, substantially any data set may be represented by an image of suitable dimensionality, where sampling may refer to extracting or reading data from the data set.

As FIG. 8 shows, in 802 data may be received describing an image which is defined in a bounded n-dimensional space, or n-space, and which may be embedded in an m-dimensional space, or m-space via an embedding function x( ), where m>n. In one embodiment, the bounded n-space may comprise a unit square (i.e., n=2). In other embodiments the bounded n-space may comprise a unit cube (n=3), a unit hyper-cube (n=4), or a unit n-cube where n>4. It is noted that the bounded n-space may not be limited to unit n-cubes, but may also comprise any other suitable geometry, including a unit n-sphere, rectangles of various dimensionalities, or any other geometry, as desired. It is also noted that the n-space is not necessarily of unit size, but may be of any size appropriate for the application or image under consideration.

In one embodiment, the received data may include an intensity function, as mentioned above. For example, for a gray-scale image, the intensity function may describe the gray-scale pixel value at each point in the image. Similarly, for a color image, the intensity function may provide pixel data for each point in the image. It is noted that various other quantities may also be represented by the intensity function.

In 804, a diffeomorphism (f,g) of the n-space may be determined. As is well known in the art, a diffeomorphism may be considered a mapping between two spaces which preserves differentiability of a mapped function. It is noted that the diffeomorphism (f,g) is for illustrative purposes only, and that other representations, e.g., f, may be appropriate.

In 806, an inverse transform $(f^{-1},g^{-1})$ of the diffeomorphism determined in 804 may be computed.

Then, as indicated in 808, a plurality of points in the bounded n-space may be selected or determined. In one embodiment, the plurality of points may comprise a Low Discrepancy Sequence. It should be noted that although selection of a Low Discrepancy Sequence of points is an exemplary use of the method, any other point set may be used as desired.

In 810, after the selection of the plurality of points in 808, the plurality of points may be mapped onto the surface via $x(f^{-1},g^{-1})$ to generate a mapped plurality of points, e.g., a mapped Low Discrepancy Sequence. Note that the function $x(f^{-1},g^{-1})$ may be a functional concatenation of the embedding function x( ) of 802 and the inverse transform of the diffeomorphism, $(f^{-1},g^{-1})$ of 806.

Finally, in 812 the mapped plurality of points may be analyzed to determine one or more characteristics of the image. In one embodiment, the mapped plurality of points may be analyzed to detect edges in the image. In other embodiments, analyzing the mapped plurality of points may include performing pattern recognition, where features or objects comprised or represented in the image may be detected and/or characterized.

As noted above, in 802 discussed above data may be received describing an image which is defined in a bounded n-dimensional space, or n-space, and which may be embedded in an m-dimensional space, or m-space via an embedding function x( ), where m>n. Thus, for example, the image may be a 2D (2-dimensional) image, and the image may be considered to be embedded in a higher dimensional space (3D or higher). This higher dimensional space may be based on or derived from other characteristics or features, such as pixel data, e.g., color and/or intensity, curvatures, gradients, abstract amplitude characteristics, Riemannian metrics, or other metrics derived from the image. For example, in one embodiment, pixel data values such as intensity values, e.g., gray scale or color pixel data values, may be interpreted as amplitude, altitude, or other features, resulting in a higher dimensional space (an example of the m-dimensional space in which the image is considered to be embedded). This higher dimensional space is suitable for various differential geometrical methods or analysis.

The embedding strategies in image processing as described herein enable the use of well-developed differential geometrical methods to solve existing and/or new problems. Differential geometry deals with smooth (differentiable) objects in spaces of dimension 1, 2, 3, . . . Some of these spaces are very familiar, e.g. n-dimensional Euclidean spaces, and some of them are abstract mathematical constructions. However, even these abstract mathematical spaces allow embeddings in Euclidean spaces of even higher dimensions.

In general, an embedding in $R^n$ may not be space filling. This may simply mean that the object exists or lives in this space. For example, a curve in 3D may still be considered one-dimensional. However, 3 dimensions may be desirable or necessary to perform the embedding. As the case of a helic demonstrates, embedding may require at least 3 dimensions, i.e., embedding may not be possible in 2 dimensions (where m=2).

According to various embodiments of the invention, the field of image processing provides for countless natural and mathematically oriented embeddings. The most natural is the interpretation of a gray-scale image as a surface in 3D. This surface may be referred to as a Monge patch. This interpretation is based on 2 independent variables x and y (location) and one dependent variable I(x,y)—intensity. The structure:

$(x, y, I(x,y))$ may form a surface in three-dimensional Euclidean space.
Another example is an RGB image. The structure is $(x, y, R(x,y), G(x,y), B(x,y))$ which is a surface in 5-dimensional Euclidean space. This results in a 5D embedding of a color image.

These two examples are relatively straightforward. The following is an exemplary collection of more complex embeddings.

(1) Given a gray-level image I(x,y), construct an artificial abstract surface based on the Riemannian metric:

$ds^2 = dx^2 + I(x,y)dy^2$

This abstract surface may be used to generate embeddings in higher dimensional spaces (it is very difficult to depict these abstract surfaces). In doing so, new classes of algorithms can be derived.

(2) The color space of all colors can be interpreted as a specific Riemannian space. Based on this an embedding can be constructed.

(3) Same as (1) but R, G, and B values of a color image generate an unusual embedding $ds^2 = R(x,y)dx^2 + 2G(x,y)dxdy + B(x,y)dy^2$ (4) Instead of using intensity values, one can also start with curvature or other features. This results in a natural embedding, where the 2D image is considered to be embedded in a higher dimensional space (3D or higher), wherein the higher dimensional space includes one or more additional dimensions (additional to x and y) based on or derived from the curvature or other features.

Various other types of embeddings may be used according to various embodiments of the invention.

Testing and Exploration

A typical scenario in nondestructive testing or during search routines is based on well-chosen locations where measurements are taken. Usually, the search space is large and a specific point operation is computationally or otherwise expensive. Efficient sampling and/or scanning strategies are necessary for reasonable performance.

It is assumed here that an efficient search strategy for an n-dimensional cube is available. Such a strategy could be based on low-discrepancy sets, homogenous grids, or other approaches. With the aid of Theorem 2 an induced strategy can be derived.

Figure 9:
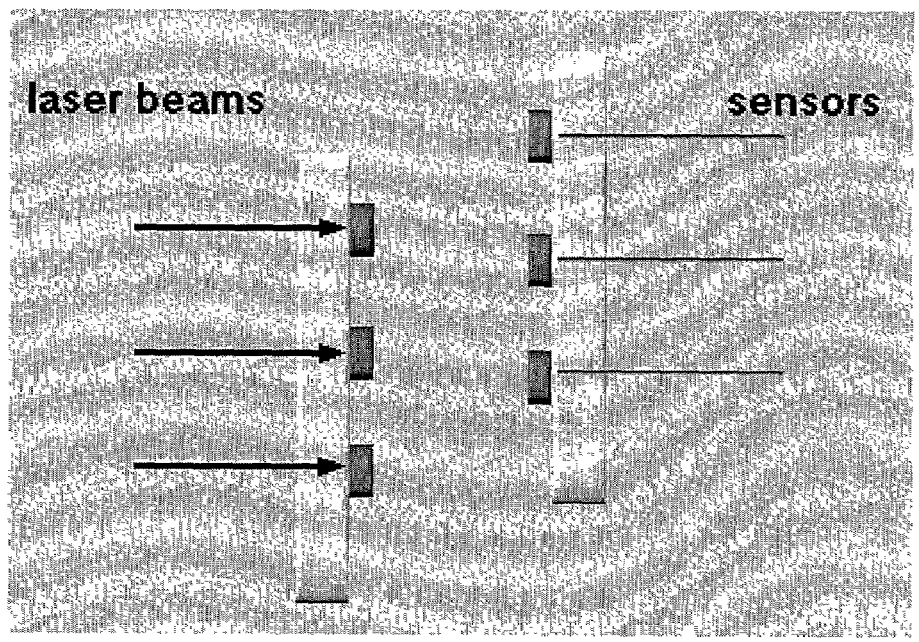
FIG. 9 illustrates a simplified model of an alignment problem in fiber optics, according to one embodiment.

FIG. 9—Example Application: Fiber Optic Arrays

FIG. 9 illustrates a simplified fiber optic array alignment problem, given an array of fibers where a second array of theses fibers must be aligned accurately. Typically, lasers are applied and the intensity of these beams may be measured to align the arrays.

Said another way, the surface may comprise a multi-dimensional space describing degrees of freedom for first and second motion stages, where the first and second motion stages couple respectively to first and second optical fibers (or groups of optical fibers). A laser beam may be directed through the first optical fiber. Samples may be taken at a plurality of points in the search space, where the sampling includes measuring the laser beam intensity through the second optical fiber at one or more of the mapped plurality of points. One or both of the first and second motion stages may be moved until the measured laser beam intensity indicates that the optical fibers are substantially aligned.

In one embodiment, if the first array is regarded as fixed with unknown position and orientation, the second array may be moved to establish an alignment. A simple model of this scenario, shown in FIG. 9, consists of 3 position degrees of freedom (x, y, and z) in combination with 3 orientation degrees of freedom (pitch $\alpha$, roll $\beta$, and yaw angle $\gamma$). This results in a 6-dimensional search space (surface) where further constraints add complexity to this space. For example, $$x^2+y^2+z^2 \leq P \text{ and } (\alpha-\alpha_0)^2+(\beta-\beta_0)^2+(\gamma-\gamma_0)^2 \leq O \qquad (12)$$

where P(osition) and O(rientation) are known parameters and $\alpha_0$, $\beta_0$, and $\gamma_0$ are given. A more general system may use constraints in form of $F_k(x,y,z,\alpha,\beta,\gamma) \in M_k$ for k=1, . . . , N where $M_k$ are manifolds in $R^6$. In case of (12) the two separate position and orientation spaces can (after normalization) be treated separately and an induced metric may be constructed. Homogeneous sets in $R^6$ may be mapped onto sets with similar properties in the search space. Topologically, the resulting search space is the product of two balls or spheres. Further applications of Low Discrepancy Sequences in the Lie group SO(3) of all rotations in $R^3$ are also contemplated. This Lie group is of fundamental importance in robotics and 3d image processing.

In one embodiment, the degrees of freedom of both motion stages may be represented by the search space or surface. In this embodiment, the space may be 12-dimensional, in that each motion stage has 3 positional degrees of freedom and 3 orientation degrees of freedom.

Networks

Tenenbaum et al. [2000], Roweis and Saul [2000] report methods of constructing manifolds representing large data sets. The algorithms describe data globally where local properties are used. The procedures are based on nearest neighbors. Included is the determination of the dimensionality of the data under consideration.

Given a large set of discrete points in a manifold, a well-distributed subset of points of this graph may be determined. Such a set should treat all parts of the point set equally well. The following algorithm can be applied.

Algorithm IV:
(IV.1) Apply Theorem 2 to generate a low-discrepancy set in this manifold.
(IV.2) Determine nodes and edges of the graph that minimize the distance to this set of the manifold. To this end, appropriate thresholds must be given.

If the number of points of the subset under construction is unknown in advance the algorithm can stop whenever a certain goal is achieved, e.g. any point of the underlying point set is in a neighborhood of a point constructed so far.

Probability Distributions

Sometimes, one is interested in a well-chosen point set where an underlying probability distribution is known. For example, find a point distribution in $[0,1]^2$ where the probability distribution $p(u,v)$ is known. The connection between this problem and an abstract surface is given by $$ds^2 = du^2 + p(u,v)^2 dv^2$$

Using Theorem 1, appropriately chosen sets of points can be derived from equally distributed sequences in $[0,1]^2$. The case of probability distributions in higher dimensional spaces or even manifolds can be treated analogously.

Memory and Carrier Medium

The computer system 102 preferably includes a memory medium on which software according to an embodiment of the present invention may be stored. The memory medium may store one or more programs to control and execute a scanning operation. The memory medium may also store a software program for preprocessing scan data, such as to generate a Low Discrepancy Sequence, described above. In one embodiment, the memory medium may also store a software program for analyzing results of a scan operation.

The term "memory medium" is intended to include an installation medium, e.g., a CD-ROM, floppy disks, or tape device; a computer system memory or random access memory (RAM) such as DRAM, SRAM, EDO RAM, RRAM, etc.; or a non-volatile memory such as a magnetic media, e.g., a hard drive, or optical storage. The memory medium may comprise other types of memory as well, or combinations thereof.

In addition, the memory medium may be located in a first computer in which the software program is stored or executed, or may be located in a second different computer which connects to the first computer over a network, such as the Internet. In the latter instance, the second computer provides the program instructions to the first computer for execution. Also, the computer system 102 may take various forms, including a personal computer system, mainframe computer system, workstation, network appliance, Internet appliance, personal digital assistant (PDA), television set-top box, or other device. In general, the term "computer system" can be broadly defined to encompass any device having at least one processor which executes instructions from a memory medium, or any device which includes programmable logic that is configurable to perform a method or algorithm.

Various embodiments further include receiving or storing instructions and/or data implemented in accordance with the foregoing description upon a carrier medium. Suitable carrier media include a memory medium as described above, as well as signals such as electrical, electromagnetic, or digital signals, conveyed via a communication medium such as networks and/or a wireless link.

However, it is noted that the present invention can be used for a plethora of applications and is not limited to the applications shown herein. In other words, the applications described herein are exemplary only, and the methods described herein may be used for any of various purposes and may be stored in and execute on any of various types of systems to perform any of various applications.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A method for analyzing an image, comprising:
   receiving data describing an image, wherein the image is defined in a bounded n-dimensional space, wherein the image is embedded in an m-dimensional real space via an embedding function x( ), and wherein m>n;
   determining a diffeomorphism (f,g) of the n-dimensional space;
   computing the inverse transform $(f^{-1}, g^{-1})$ of the determined diffeomorphism (f,g);
   selecting a plurality of points in the n-dimensional space;
   mapping the plurality of points onto the image using $x(f^{-1},g^{-1})$ thereby generating a mapped plurality of points on the image; and
   analyzing the mapped plurality of points to determine characteristics of the image.

2. The method of claim 1,
   wherein the plurality of points comprise a Low Discrepancy Sequence;
   wherein the mapped plurality of points comprises a mapped Low Discrepancy Sequence.

3. The method of claim 1, further comprising:
   generating output comprising the mapped plurality of points.

4. The method of claim 1, wherein said analyzing comprises detecting one or more edges in the image.

5. The method of claim 1, wherein the bounded n-dimensional space comprises a unit n-cube.

6. The method of claim 5, wherein n=2, and wherein the n-cube comprises a unit square.

7. The method of claim 5, wherein n=3, and wherein the n-cube comprises a unit cube.

8. The method of claim 5, wherein n>3, and wherein the n-cube comprises a hyper-cube of dimensionality greater than 3.

9. The method of claim 1,
   wherein the image comprises a Riemannian manifold, and wherein the received data comprises a Riemannian metric of the image.

10. The method of claim 1,
    wherein the received data comprises an intensity function of the image.

11. The method of claim 1,
wherein the image comprises a 3-dimensional image;
wherein said analyzing comprises analyzing the mapped plurality of points to determine one or more characteristics of the 3-dimensional image.

12. The method of claim 1,
wherein the image comprises an n-dimensional image, wherein n is greater than 3; and
wherein said analyzing comprises analyzing the mapped plurality of points to determine one or more characteristics of the n-dimensional image.

13. The method of claim 1,
wherein said analyzing the mapped plurality of points to determine characteristics of the image comprises performing pattern recognition on the image.

14. A method for generating a Low Discrepancy Sequence on an image, comprising:
receiving data describing an image, wherein the image is defined in a unit n-cube, wherein the image is embedded in an m-dimensional real space via an embedding function $x( )$, and wherein $m > n$;
determining a diffeomorphism $(f,g)$ of the unit n-cube;
computing the inverse transform $(f^{-1}, g^{-1})$ of the determined diffeomorphism $(f,g)$;
selecting a Low Discrepancy Sequence in the unit n-cube;
mapping the Low Discrepancy Sequence onto the image using $x(f^{-1}, g^{-1})$, thereby generating a Low Discrepancy Sequence on the image; and
generating output comprising the mapped Low Discrepancy Sequence.

15. The method of claim 14, further comprising:
analyzing the mapped Low Discrepancy Sequence to determine one or more characteristics of the image.

16. The method of claim 15,
wherein said analyzing comprises detecting one or more edges in the image.

17. The method of claim 15,
wherein said analyzing comprises performing pattern recognition on the image.

18. The method of claim 15,
wherein the image comprises a 3-dimensional image;
wherein said analyzing comprises analyzing the mapped plurality of points to determine one or more characteristics of the 3-dimensional image.

19. The method of claim 15,
wherein the image comprises an n-dimensional image, wherein n is greater than 3; and
wherein said analyzing comprises analyzing the mapped plurality of points to determine one or more characteristics of the n-dimensional image.

20. The method of claim 14, wherein n=2, and wherein the unit n-cube comprises a unit square.

21. The method of claim 14, wherein n=3, and wherein the unit n-cube comprises a unit cube.

22. The method of claim 14, wherein n>3, and wherein the unit n-cube comprises a unit hyper-cube of dimensionality greater than 3.

23. The method of claim 14,
wherein the received data comprises an intensity function of the image.

24. The method of claim 14,
wherein the image comprises a Riemannian manifold, and wherein the received data comprises a Riemannian metric of the image.

25. A system for analyzing an image, comprising:
a sensor; and
a computer which is operable to couple to said sensor, said computer comprising:
a CPU;
a memory medium which is operable to store program instructions; and
an input for receiving data describing an n-dimensional image, wherein the image is defined in a bounded n-dimensional space, wherein the image is embedded in an m-dimensional real space via an embedding function $x( )$, and wherein $m > n$;
wherein the CPU is operable to execute said program instructions to perform:
determining a diffeomorphism f of the n-dimensional space;
computing the inverse transform $f^{-1}$ of the determined diffeomorphism f;
selecting a plurality of points in the n-dimensional space;
mapping the plurality of points onto the image using $x(f^{-1})$, thereby generating a mapped plurality of points on the image;
wherein said computer and said sensor are operable to perform:
sampling the image using at least a subset of the mapped plurality of points to generate samples of the image; and
wherein the CPU is further operable to execute said program instructions to perform:
analyzing the samples of the image to determine characteristics of the image.

26. The system of claim 25,
wherein the plurality of points comprises a Low Discrepancy Sequence;
wherein the mapped plurality of points comprises a mapped Low Discrepancy Sequence.

27. The system of claim 25, wherein the CPU is further operable to execute said program instructions to perform:
generating output comprising the mapped plurality of points.

28. The system of claim 25, wherein the bounded n-dimensional space comprises a unit n-cube.

29. A system for analyzing a image, comprising:
a computer, comprising:
a CPU;
a memory medium which is operable to store program instructions; and
an input for receiving data describing an n-dimensional image, wherein the image is defined in a bounded n-dimensional space, wherein the image is embedded in an m-dimensional real space via an embedding function $x( )$, and wherein $m > n$;
wherein the CPU is operable to execute said program instructions to perform:
determining a diffeomorphism f of the n-dimensional space;
computing the inverse transform $f^{-1}$ of the determined diffeomorphism f;
selecting a Low Discrepancy Sequence in the n-dimensional space; and
mapping the Low Discrepancy Sequence onto the image using $x(f^{-1})$, thereby generating a mapped Low Discrepancy Sequence on the image;
sampling the image using at least a subset of the mapped Low Discrepancy Sequence to generate samples of the image; and
analyzing the samples of the image to determine characteristics of the image.

30. The system of claim 29,
wherein the image comprises an image of an object;
wherein said analyzing comprises analyzing the samples of the image to determine one or more characteristics of the object.

31. A system for generating a Low Discrepancy Sequence on an image, comprising:
a computer, comprising:
a CPU;
a memory medium which is operable to store program instructions; and
an input for receiving data describing an n-dimensional image, wherein the image is defined in a unit n-cube, wherein the image is embedded in $R^m$ via an embedding function x( ), and wherein m>n;
wherein the CPU is operable to execute said program instructions to perform:
determining a diffeomorphism f of the unit n-cube;
computing the inverse transform $f^{-1}$ of the determined diffeomorphism f;
selecting a Low Discrepancy Sequence in the unit n-cube;
mapping the Low Discrepancy Sequence onto the embedded image using $x(f^{-1})$, thereby generating a Low Discrepancy Sequence on the image; and
generating output comprising the mapped Low Discrepancy Sequence.

32. A memory medium containing program instructions for analyzing an image, wherein said program instructions are executable to perform:
receiving data describing an n-dimensional image, wherein the image is defined in a bounded n-dimensional space, wherein the image is embedded in an m-dimensional real space via an embedding function x( ), and wherein m>n;
determining a diffeomorphism f of the n-dimensional space;
computing the inverse transform $f^{-1}$ of the determined diffeomorphism f;
selecting a plurality of points in the n-dimensional space;
mapping the plurality of points onto the image using $x(f^{-1})$, thereby generating a mapped plurality of points on the image;
sampling the image using at least a subset of the mapped plurality of points to generate samples of the image; and
analyzing the samples of the image to determine characteristics of the image.

33. The method of claim 32,
wherein the plurality of points comprises a Low Discrepancy Sequence;
wherein the mapped plurality of points comprises a mapped Low Discrepancy Sequence.

34. A memory medium containing program instructions for analyzing an image, wherein said program instructions are executable to perform:
receiving data describing an image, wherein the image is defined in a bounded n-dimensional space, wherein the image is embedded in an m-dimensional real space via an embedding function x( ), and wherein m>n;
determining a diffeomorphism f of the n-dimensional space;
computing the inverse transform $f^{-1}$ of the determined diffeomorphism f;
selecting a Low Discrepancy Sequence in the n-dimensional space;
mapping the Low Discrepancy Sequence onto the image using $x(f^{-1})$, thereby generating a mapped Low Discrepancy Sequence on the image; and
sampling the image using at least a subset of the mapped Low Discrepancy Sequence to generate samples of the image; and
analyzing the samples of the image to determine characteristics of the image.

35. The memory medium of claim 34,
wherein the image comprises a image of an object;
wherein said analyzing comprises analyzing the samples of the image to determine one or more characteristics of the object.

36. A memory medium containing program instructions for generating a Low Discrepancy Sequence on an image, wherein said program instructions are executable to perform:
selecting an image S, wherein S is defined in a unit n-cube, wherein S is embedded in $R^m$ via an embedding function x( ), and wherein m>n.
determining a diffeomorphism f of the unit n-cube;
computing the inverse transform $f^{-1}$ of the determined diffeomorphism f;
selecting a Low Discrepancy Sequence in the unit n-cube;
mapping the Low Discrepancy Sequence onto the embedded image S using $x(f^{-1})$, thereby generating a Low Discrepancy Sequence on the image S; and
generating output comprising the mapped Low Discrepancy Sequence.

* * * * *